(12) United States Patent
Geim et al.

(10) Patent No.: US 9,017,474 B2
(45) Date of Patent: Apr. 28, 2015

(54) FUNCTIONALIZED GRAPHENE AND METHODS OF MANUFACTURING THE SAME

(75) Inventors: Andre Geim, Manchester (GB); Rahul Raveendran-Nair, Manchester (GB); Kostya Novoselov, Manchester (GB)

(73) Assignee: The University of Manchester, Manchester (GB)

( * ) Notice: Subject to any disclaimer, the term of this patent is extended or adjusted under 35 U.S.C. 154(b) by 436 days.

(21) Appl. No.: 13/158,064

(22) Filed: Jun. 10, 2011

(65) Prior Publication Data

US 2011/0303121 A1    Dec. 15, 2011

(30) Foreign Application Priority Data

Jun. 10, 2010   (GB) .................................. 1009718.6

(51) Int. Cl.
*C01B 31/04* (2006.01)
*B82Y 30/00* (2011.01)
*B82Y 40/00* (2011.01)

(52) U.S. Cl.
CPC ............. *C01B 31/0484* (2013.01); *B82Y 30/00* (2013.01); *B82Y 40/00* (2013.01); *C01B 2204/30* (2013.01)

(58) Field of Classification Search
CPC combination set(s) only.
See application file for complete search history.

(56) References Cited

U.S. PATENT DOCUMENTS

| | | | |
|---|---|---|---|
| 2007/0231696 A1* | 10/2007 | Yazami et al. ............. | 429/231.7 |
| 2011/0068290 A1* | 3/2011 | Haddon et al. ......... | 252/62.51 R |
| 2011/0156019 A1* | 6/2011 | Tessler et al. ................... | 257/40 |
| 2011/0186786 A1* | 8/2011 | Scheffer et al. ............... | 252/510 |
| 2011/0186789 A1* | 8/2011 | Samulski et al. ............. | 252/514 |
| 2012/0021293 A1* | 1/2012 | Zhamu et al. .............. | 429/231.5 |

OTHER PUBLICATIONS http://www.merriam-webster.com/dictionary/composite; May 23, 2014.*
Blake, P., et al., "Graphene-based liquid crystal device," Nano Lett., 8(6):1704-1708, (Apr. 30, 2008).
Castro Neto, A., et al., "The electronic properties of graphene," Rev. Mod. Phys., 81(1):109-162, (2009).
Charlier, J., et al., "First-principles study of graphite monofluoride $(CF)_n$," Phys Rev. B, 47(24):16162-16168, (1993).
Cheng, S., "Reversible fluorination of graphene: towards a two-dimensional wide bandgap semiconductor," J. Am. Chem. Soc., 101:3832-3841, (1979).
Conesa, J. and Font, R., "Poytetrafluoroethylene decomposition in air and nitrogen," Polym. Eng. Scie., 41(12):2137-2147, (Dec. 2001).
Eda, C. and Chhowalla, M., "Chemically derived graphene oxide: towards large-area thin-film electronics and optoelectronics," Adv. Mater., 22(22):2392-2415, (Jun. 11, 2010).

(Continued)

*Primary Examiner* — Guinever Gregorio
(74) *Attorney, Agent, or Firm* — Greenberg Traurig, LLP; Chinh H. Pham; Natalie Salem

(57) ABSTRACT

The present invention relates to the novel material fluorographene (FG), methods of making fluorographene, and its applications in electronics and related fields. The fluorographene also finds use in improving the properties of composite materials by incorporating the fluorographene of the invention with one or more materials such as fluoropolymers (FP) and the like. Conventionally, FP inter-chain interactions are very weak but spread over the area of FG, FG is able to act as a very effective and compatible reinforcement.

13 Claims, 12 Drawing Sheets

(56) References Cited

OTHER PUBLICATIONS

Elias, D., et al., "Control of graphene's properties by reversible hydrogenation: Evidence for graphene," Science, 323(5914):610-613, (Jan. 30, 2009).
Geim, A. and Novoselov, K., "The rise of graphene," Nature Mater., 6:83-191, (2007).
Geim, A., "Status and prospects," Science, 324(5934):1530-1534, (Jun. 19, 2009).
Guinea, F., et al., "Energy gaps and a zero-field quantum Hall effect in graphene by strain engineering," Nature Phys., 6:30-33, (2010).
Han, M., et al., "Energy band-gap engineering of graphene nanoribbons," Phys. Rev. Lett., 98(20):206805, (2007).
Hernandez, Y., et al., "High-yield production of graphene by liquid-phase exfoliation of graphite," Nat. Nanotechnol., 3:563-568, (Sep. 2008).
Hills, M. and Arnold, G., "Chemical treatment of fused silica with xenon difluoride," Applied Surface Science, 47(1):77-90, (Jan. 1991).
Kita, Y., et al., "Chemical composition and crystal structure of graphite fluoride," J. Am. Chem. Soc., 101(14):3832-3841, (Jul. 4, 1979).
Kravets, V., et al., "Spectroscopic ellipsometry of graphene and an exciton-shifted van Hove peak in absorption," Phys. Rev. B, 81(15):155413, (2010).
Lee, C., et al., "Measurement of the elastic properties and intrinsic strength of monolayer graphene," Science, 321(5887):385-388, (Jul. 18, 2008).
Li, X., et al., "Chemically derived, ultrasmooth graphene nanoribbon semiconductors," Science, 319(5867):1229-1232, (Feb. 29, 2008).
Liu, H., "Photochemical reactivity of graphene," J. Am. Chem. Soc., 131(47):17099-17101, (2009).
McFeely, F., et al., "Synchrotron photoemission investigation of the initial stages of fluorine attack on Si surfaces: Relative abundance of fluorosilyl species," PRB, 30(2):764-770, (1984).
Meyer, J., et al., "Hydrocarbon lithography on graphene membranes," Appl. Phys. Lett., 92:123110, (2008).
Morar, J., et al., "Synchrotron photoemission investigation: Fluorine on silicon surfaces," APL, 45(2):174, (1984).
Nair, R., et al., "Fine structure constant defines visual transparency of graphene," Science, 320(5881):1308, (Jun. 6, 2008).
Nair, R., et al., "Fluorographene: a two-dimensional counterpart of Teflon,"Small, 6(24):2877-2884, (Dec. 20, 2010).
Novoselov, K., et al., "Two-dimensional atomic crystals," Proc. Natl. Acad. Sci. USA, 102(30):10451-10453, (Jul. 26, 2005).
Park, S. and Ruoff, R., "Chemical methods for the production of graphenes," Nature Nanotechnol., 4:217-224, (2009).
Ponomarenko, L., et al., "Chaotic dirac billiard in graphene quantum dots," Science, 320(5874):356-358, (Apr. 18, 2008).
Robinson, J., et al., "Properties of fluorinated graphene films," Nano Left, 10(8):3001-3005, (Aug. 11, 2010).
Ruff, O. and Bretschneider, O., "Die reaktionsprodukte der verschiedenen Kohlenstoffformen mit Fluor II (Kohlenstoff-monofluorid)," Z. Anorg. Allg. Chem., 217(1):1-18, (Feb. 23, 1934). (English translation of abstract provided).
Ruoff, R., "Calling all chemists," Nature Nanotech., 3:10-11, (Jan. 2008).
Schedin, F., et al., "Detection of individual gas molecules absorbed on graphene," Nature Mater., 6:652-655, (2007).
Sharma, R., "Anomalously large reactivity of single graphene layers and edges toward electron transfer chemistries," Nano Lett., 10(2):398-405, (Jan. 7, 2010).
Sofo, J., et al., "Graphane: A two-dimensional hydrocarbon," Phys. Rev. B., 75(15):153401, (2007).
Stauber, T., "Optical conductivity of graphene in the visible region of the spectrum," Phys. Rev. B, 78(8):085432, (2008).
Takagi, Y. and Kusakabe, K., "Transition from direct band gap to indirect band gap in fluorinated carbon," Phys Rev. B., 65(12):121103, (2002).
Takahagi, T., et al., "Chemicl structure and reactivity of a silicon single cyrstal surface fluorinated by xenon fluoride," J. Appl. Phys., 76(5):3140, (1994).
Touhara, H., et al., "On the structure of graphite fluoride," Z. Anorg. Allg. Chem., 544(1):7-20, (Jan. 1987).
Watanabe, N. et al., "Graphite fluorides," Elsevier Press, Amsterdam, Ch. 2: 30-39 (1988).
Watanabe, N. et al., "Graphite fluorides," Elsevier Press, Amsterdam, Ch. 5: 149-203 (1988).
Watanabe, N. et al., "Graphite fluorides," Elsevier Press, Amsterdam, Ch. 7 228-239(1988).
Baraket et al., "The functionalization of graphene using electron-beam generated plasmas", Applied Physics Letters, vol. 96, No. 23, pp. 231501-1-231501-3, Jun. 8, 2010.
Bon et al., "Plasma Fluorination of Chemically Derived Graphene Sheets and Subsequent Modification With Butylamine", Chemistry of Materials, vol. 21, No. 14, pp. 3433-3438, Jul. 28, 2009.
Cheng et al., "Reversible fluorination of graphene: Evidence of a two-dimensional wide bandgap semiconductor", Physical Review B (Condensed matter and Materials Physics) American Physical Society, vol. 81, No. 20, pp. 205435-1-205435-5, May 3, 2010.
Unger et al., "Fluorination of carbon nanotubes with xenon difluoride", Chemical Physics Letters, vol. 399, No. 1-3, pp. 280-283, Nov. 21, 2004.
International Search Report for PCT/GB2011/051087 mailed Oct. 25, 2011.

\* cited by examiner

FUNCTIONALIZED GRAPHENE AND METHODS OF MANUFACTURING THE SAME

RELATED APPLICATIONS

This application claims priority to United Kingdom Patent Application No. GB1009718.6 filed on Jun. 10, 2010, the content of which is herein incorporated by reference in its entirety. Reference is also made to co-pending International Application No. PCT/GB2011/051087, filed Jun. 10, 2011, which is incorporated herein by reference.

FIELD OF THE INVENTION

The present invention relates to graphene, and more particularly, to fluorographene (FG) and its applications.

BACKGROUND

The extraordinary properties of graphene attract interest because of graphene's electronic properties. It is known that graphene can be considered a giant macromolecule that can be modified in chemical reactions [Geim, A. K. Graphene: Status and prospects. *Science* 324, 1530-1534 (2009) and Ruoff, R. Calling all chemists. *Nature Nanotechnol.* 3, 10-11 (2008)]. Graphene's surface has been functionalised to a limited degree with various atoms and molecules [Schedin, F., Geim, A. K., Morozov, S. V. Hill, E. W., Blake, P., Katsnelson, M. I. & Novoselov, K. S. Detection of individual gas molecules adsorbed on graphene. *Nature Mater.* 6, 652-655 (2007); Park, S. & Ruoff, R. S. Chemical methods for the production of graphenes. *Nature Nanotechnol.* 4, 217-224 (2009); Liu, H., Ryu, S., Chen, Z., Steigerwald, M. L., Nuckolls, C. & Brus, L. E. Photochemical reactivity of graphene. *J. Am. Chem. Soc.* 131, 17099-17101 (2009); and Sharma, R., Baik, J. H., Perera, C. J. & Strano, M. S. Anomalously large reactivity of single graphene layers and edges toward electron transfer chemistries. *Nano Lett.* 10, 398-405 (2010)].

Graphene is a single layer honeycomb lattice of carbon atoms and has attracted great interest due to its thermal conductivity properties, current carrying properties and electronic properties. Because of its band-structure, single layer graphene is a zero-gap semiconductor. However, in many applications, such as in semi-conductor devices, it would be desirable to engineer graphene to introduce suitable properties such as band gap so as to use in semiconductor devices, and other integrated electronics.

This requires the opening of an energy gap $E_g$ in graphene's gapless electronic spectrum to allow field-effect transistors with sufficiently low dissipation in the off state. There are extensive efforts underway to open such a gap by physical means that include the use of nanoribbons [Han, M. Y., Ozyilmaz, B. Zhang, Y. B. & Kim, P. Energy band-gap engineering of graphene nanoribbons. *Phys. Rev. Lett.* 98, 206805 (2007); and Li, X. L., Wang, X. R., Zhang, L., Lee, S. W. & Dai, H. J. Chemically derived, ultrasmooth graphene nanoribbon semiconductors. *Science* 319, 1229-1232 (2008)]. The use of quantum dots [Ponomarenko, L. A., Schedin, F., Katsnelson, M. I., Yang, R., Hill, E. W., Novoselov, K. S. & Geim, A. K. Chaotic dirac billiard in graphene quantum dots. *Science* 320, 356-358 (2008)] represents another approach. Similarly, the use of strain [Guinea, F., Katsnelson, M. I. & Geim, A. K. Energy gaps and a zero-field quantum Hall effect in graphene by strain engineering. *Nature Phys.* 6, 30-33 (2010)], double gating, etc. [Geim, A. K. & Novoselov, K. S. The rise of graphene. *Nature Mater.* 6, 183-191 (2007); Castro Neto, A. H., Guinea, F., Peres, N. M. R., Novoselov, K. S. & Geim, A. K. The electronic properties of graphene. *Rev. Mod. Phys.* 81, 109-162 (2009); and Geim, A. K. Graphene: Status and prospects. *Science* 324, 1530-1534 (2009)] all represent methodologies that have been tried for this purpose.

Currently, there are two known derivatives of graphene: namely, graphene oxide (GO) and graphane. GO is essentially a graphene sheet randomly decorated with hydroxyl and epoxy groups and obtained by exposure of graphite to liquid oxidizing agents [Park, S. & Ruoff, R. S. Chemical methods for the production of graphenes. *Nature Nanotechnol.* 4, 217-224 (2009) and Eda, C. & Chhowalla M. Chemically derived graphene oxide: towards large-area thin-film electronics and optoelectronics. *Adv. Mater.* 22, 1-24 (2010)]. On a microscopic level, GO appears inhomogeneous with a mixture of regions that are pristine and densely decorated. Graphane, on the other hand, is a stoichiometric derivative of graphene with a hydrogen atom attached to each carbon [Sofo, J. O. Chaudhari, A. S. & Barber, G. D. Graphane: A two-dimensional hydrocarbon. *Phys. Rev. B* 75, 153401 (2007)]. This material is, as might be expected, relatively unstable and thus of no practical value for electrons and other applications. It is known that graphene hydrogenated from either one or both sides rapidly looses H at moderate T. Obviously, this is a serious disadvantage and casts doubts that graphane could ever be used in applications where a stability is required.

There are a number of problems in functionalizing graphene. One problem is that the resulting product may contain defects or dislocations. Presence of defects or dislocations can lead to the inhomogeneity of the product and for, some applications, does not enable the required electronic structure to be obtained. Functionalized or partly functionalized material can be unstable and tends to lose the bound atoms from its surface. It is thus can be very difficult to functionalize the graphene in either a uniform or complete manner which can render the end product unstable and useless for commercial applications.

There is therefore a need to address these challenges with known materials and to provide reliable methods for producing a uniform and homogeneous graphene derivative that is stable and has good electronic properties.

DETAILED DESCRIPTION OF THE INVENTION

Figure 1:
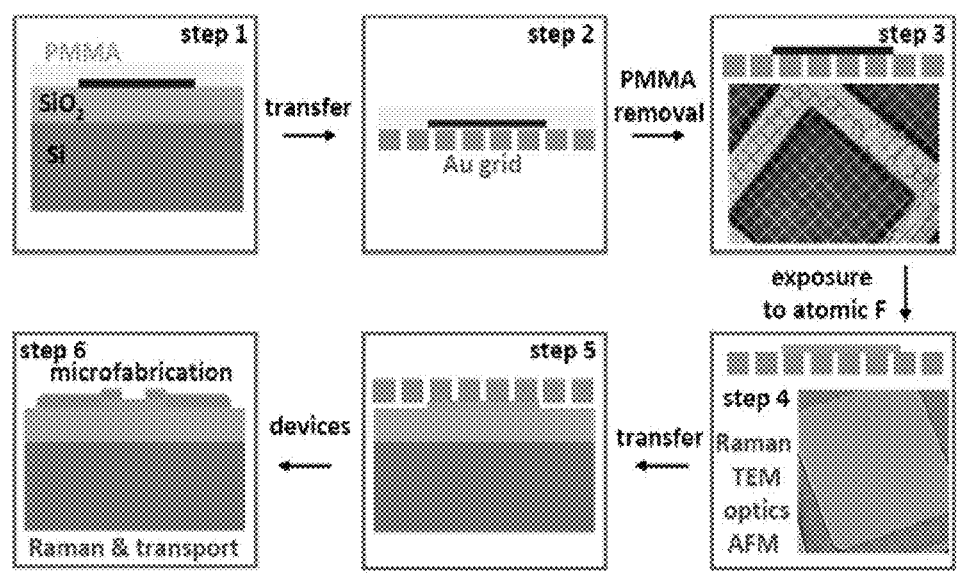
FIG. 1 shows the process of converting graphene to fluorographene (FG).

The present invention relates to functionalized graphene, fluorographene (FG), the methods of manufacturing the same, and its applications, including applications in electronics and related fields. Aspects of the invention relate to the chemical modification of graphene to produce fluorographene having suitable electronic structure, and the combination of FG with another material or other materials to produce a FG-polymer composite material.

It is of importance that the number of defects in electronic-grade FG is low. Defects in FG would create localized states in the electronic band-gap, which can be extremely detrimental for the performance of the transistors or make it completely unoperational (due to pinning of the Fermi level in the area of the gap, below mobility edge).

Another possible use of FG in electronics is as a high-quality insulator. FG is a high-quality crystal with a large energy gap in electronic spectrum and can serve as an insulator in field effect transistors. Either monolayer or several layers of FG can be used for these purposes. Another application can be to form planar graphene structures. By fluorinating only certain areas of graphene, conductive paths of arbitrary shape can be formed from a continuous graphene layer.

Nano Lett 2010, 10, 3001-3005 discloses the properties of fluorinated graphene films. Importantly, the estimation of a band gap of fluorinated graphene in this paper is based only on the theoretical calculations and not supported by any experimental results.

The assessment of the degree of fluorination of graphene, which is supported on Silicon-on-insulator (SOI), is based on the XPS analysis. Unfortunately, the analysis of the XPS data in the paper is unclear and the methodology suffers from certain inaccuracies. For example, the claims on stoichiometry (CF) of fluorinated samples are based on the estimation of atom % of fluorine (50%) on SOI. However, this can be misleading. For instance, the authors of the paper ignored the fluorination of their silicon oxide surface during the fluorine exposure of SOI to $XeF_2$. The effect of exposure of fluorine on silicon and $SiO_2$ surfaces have been well studied (see for example: J. F Morar et. al. APL, 45,174; Applied Surface Science 47 (1991) 77-90; F. R McFeely et. al. PRB 30, 764-770; and T. Takahagi et. al. J. Appl, Phys, 76, 3140) and the formation of Si—F, Si—F2, Si—F3 bonds in this case is well documented. Once this is accounted for, the F/C ratio in that material is actually much lower than the figures that the authors use in their calculations. The paper is based on the erroneous assumption that all detected fluorine is attached to carbon which is not the case.

Evidence of this point can be seen in the paper where, for example, the marked Si—O peak in FIG. 2E clearly looks a combination of Si—F and Si—O peaks. Moreover C1s spectra shown in FIGS. 2C and 2D do not support a conclusion that the fluorination has proceeded fully; both spectra show the presence of C—C peak at 284.5 eV and this indicates the presence of Sp2 bonded carbon.

Further doubt arises as to the nature of the material these workers studied. Apart from XPS, no clear evidence has been provided for the existence or presence of fluorinated graphene on SOI (for example using other methods of characterisation like SEM, AFM, etc.). In fact, the observed XPS data can equally arise from fluorinated hydrocarbon contaminations.

Most significantly, there is no clear evidence of suspended graphene in this paper. This fact is very important for obtaining double-sided fluorination. The authors of the paper claimed that the graphene on Si/SiO2/Si can be suspended by etching the upper Si layer by $XeF_2$ gases penetrating through defects on graphene films or through the side of the Si layer. This claim does not correspond with the observed facts because if this were the case there should be almost no defects according to their Raman data showing no D peaks (see FIG. 4A).

In addition, the authors of the paper provided the decreasing Si—Si XPS peak intensity as an evidence of Si etching, but it is not clear where the etched Si atoms go. It might be concluded that the etched gases are escaping back through the defect holes but, in fact, this is not physically possible because the material would need to contain a significant number of intentionally made diffusion holes or cracks. In fact, it is likely that the CVD graphene films are broken into many small pieces of non-continuous fluorinated graphene flakes during $XeF_2$ etching. This represents further evidence that the conclusions were made based on wrong assumptions.

In accordance with certain embodiments of the present invention, methods for opening the band gap through graphene chemistry in a manner that has not previously been possible are disclosed below.

Fluorographene or fluorinated graphene (FG) is a fluorocarbon derivative of graphene. In some embodiments, fully fluorinated graphene (fluorographene) is synthesized by exposure of both surfaces of suspended graphene to atomic fluorine. In some embodiments, the fluorographene of the present invention can have different structural, optical, chemical, thermal, and electronic properties than non-fluorinated graphene. In some aspects of the invention, the fluorographene is semiconducting. In some embodiments, the fluorographene comprises a band gap suitable for integrated electronic. In some aspects, the FG of the invention is a semiconductor with a gap of ≈3 eV. In some embodiments, the fluorographene has insulating properties. Properties of fluorographene have been investigated for a number of applications and are disclosed herein.

According to one aspect of the present invention, there is provided a functionalized graphene compound comprising graphene and fluorine, wherein the amount of fluorine bonded to graphene is at least 50 atom % of the theoretical maximum stoichiometry possible for a graphene fluorine compound. In the context of this aspect, 50 atom % fluorine refers to a ratio of 0.50:1 of fluorine to carbon, and a fluorine to carbon atomic ratio of 0.50:1 or more means 'fully' fluorinated graphene. In some embodiments, a ratio of 0.55:1 or more in necessary to enable clearly defined band gap to be established in the material. In some embodiments, the amount of fluorine bonded to graphene is at least 55 atom % of the theoretical maximum stoichiometry possible for a graphene fluorine compound or more usually is at least 75 atom %. More preferably it is 85 atom % of the theoretical maximum stoichiometry possible for a graphene fluorine compound, i.e. the ration of fluorine to carbon is 0.85:1.

In some embodiments, the fluorine reacts with and bonds to the graphene so that substantially all of the carbon atoms in the graphene sheet bear a fluorine atom. A bonding level of 100 atom % represents the theoretical case in which all of the carbon atoms in the graphene are bound to one fluorine atom each. This represents the situation of 1:1 stoichiometry between fluorine atoms and carbon atoms. In some embodiments the stoichiometry of the graphene fluoride compound, referred to herein as fluorographene, is at least 0.25:1 in terms of the fluorine to carbon ratio. The fluorine atoms may bond to graphene from either side of the graphene sheet. The method of the invention enables the fluorination to occur on one or both sides of the graphene. However, in order to achieve high stoichiometries it is important that double-sided fluorination can occur and this is a significant advantage of the method and materials of the present invention.

In an embodiment, the stoichiometric ratio of the fluorographene is at least 0.50:1, and is more preferably 0.75:1 or 0.85:1. A purer form of fluorographene can have a ratio 0.9:1, i.e. there is at least 90 atom % of fluorine in the fluorographene. More preferably, the ratio is at least 0.95:1. Advantageously, the stoichiometry is at least 0.97:1, and most preferably it is at least 0.98:1. In some embodiments, the presently disclosed process can produce a material having 1:1 stoichiometry within the scope of practical measurement and allowing a measuring tolerance of ±0.05, or ideally ±0.01.

Another aspect of the invention relates to more 'defective' FG material, which is principally intended for use in polymer composites and other structural materials as a FG-polymer composite material. It is of course also possible to use the higher stoichiometry FG material in such applications. This lower stoichiometry material may not have a band gap and has more defects. In this case, the FG may be provided with a F:C ratio of 0.25:1 or more. The material may still be stable over an extended period of time to loss of fluorine atoms, especially if, for example, encapsulated within a polymer matrix such as a fluoropolymer.

Some aspects of the invention relate to the use of functionalized graphene compounds. According to some embodiments, there is provided the use of a functionalized graphene compound, wherein the functionalized graphene comprises graphene and fluorine, and wherein the amount of fluorine bonded to graphene is at least 25 atom % of the theoretical maximum stoichiometry possible for a graphene fluorine compound, as a structural material, an electronic component, an optical component, a magnetic component or as a coating.

Some aspects of the invention relate to the chemical and/or thermal stability of the FG of the invention. One skilled in the art will appreciate that without adequate stability, the material has no practical utility. One feature that is common to all of the FG of the invention, whether it be the high stoichiometry FG having a F:C ratio of 0.5:1 or greater, or the more 'defective' FG having more defects and possibly lower stoichiometry i.e. FG with a F:C ratio of 0.25:1 or more, is that the material is stable over an extended period of time to loss of fluorine atoms. This stability at room temperature is measured in terms of substantially no loss of fluorine atoms over a period of at least 24 hours, and more usually at least 168 hours, and preferably at least 720 hours; more preferably it is stable for at least 9000 hours and most preferably it is stable for at least 100,000 hours.

The FG of the present invention can also be characterised in terms of its thermal stability. In other words, the FG of the invention is also stable at elevated temperatures such as at 200° C., 260° C. and even 350° C. Similar methods of characterizing FPs are widely known and used in academic literature.

For practical purposes, the FG can be characterized in terms of its continuous use temperature (CUT). This can be defined as the temperature at which 50% of properties are lost after a defined time. In the case of the invention, the FG exhibits a continuous use temperature of at least 100° C., and more preferably at least 150° C., further preferably at least 200° C., and most preferably at least 260° C. In some cases, the FG is stable to loss of fluorine at 350° C. The CUT will depend on the ultimate use of the material and for example whether it is incorporated in a composite material or used in its own right as 'free' FG.

In some embodiments, the FG of the present invention can be defined in terms of its defects. In some embodiments, the FG comprises up to 50% defects, in the form of intrinsic defects, to substantially defect-free FG containing 20% or less defects and ideally having less than 10%, 5%, 2%, 1% or 0.1% defects, depending on ultimate intended use.

Methods of Making FG

Aspects of the invention relate to methods of manufacturing FG. Two complementary approaches can be used to prepare FG of the present invention. In some embodiments, FG can be prepared by mechanical cleavage of commercially available GrF [Novoselov, K. S., Jiang, D., Schedin, F., Booth, T. J., Khotkevich, V. V., Morozov, S. V. & Geim, A. K. Two-dimensional atomic crystals. *Proc. Natl. Acad. Sci. USA* 102, 10451-10453 (2005) and Cheng, S. H., Zou, K., Gutierrez, H. R., Gupta, A., Shen, N., Eklund, P. C., Sofo, J. O., Zhu, J., Okino, F. Reversible fluorination of graphene: towards a two-dimensional wide bandgap semiconductor. arxiv: 1005.0113 (2010)]. In some embodiments, monolayers or atomic planes of about 1 μm in size are extracted. The white powder material produced in this way may contain structural defects [Kita, Y., Watanabe, N. & Fujii, Y. Chemical composition and crystal structure of graphite fluoride. *J. Am. Chem. Soc.* 101, 3832-3841 (1979)]. Accordingly, the monolayers can be fragile and prone to rupture.

In some embodiments, graphene was exposed to atomic F formed by decomposition of xenon difluoride ($XeF_2$). This approach has a clear advantage with respect to possible fluorination in plasma (as employed for hydrogenation of graphene) because the use of $XeF_2$ avoids any potential damage due to ion bombardment. This helps ensure the structural integrity of the FG produced. Furthermore, fluorination by $XeF_2$ is a simple low-hazard procedure that can be implemented in any laboratory. In addition, this method is scalable and can be used in large scale production of FG.

In some aspects, the exposure of suspended graphene to atomic F can lead to a near-stoichiometric or stoichiometric derivative that is stable under a range of conditions. In some embodiments, the FG of the invention can be a wide gap semiconductor. According to some embodiments, the optical and electronic properties of FG can be substantially different from those of graphene and graphane due to the wide energy gap opened in the electronic spectrum.

Another aspect of the present invention concerns a method of preparing a functionalized graphene compound as described above comprising graphene and fluorine. According to some aspects of the present invention, there is provided a method of preparing a functionalized graphene compound comprising graphene and fluorine, wherein the stoichiometric amount of fluorine bonded to graphene is at least 0.25:1. Preferably, the ratio is at least 0.50:1. In some embodiments, the method includes:

(a) obtaining a sheet of graphene;

(b) determining the structural integrity of the graphene sheet and, on the basis of that determination, either employing the graphene sheet in step (a) or rejecting the graphene sheet and repeating step (a);

(c) exposing the graphene sheet from step (b) to a source of fluorine at elevated temperature and pressure in a reaction vessel, and (d) recovering fluorographene from the reaction vessel.

In some embodiments, the steps can be taken in the chronological sequence presented. In some embodiments, the graphene sheet can be exposed to the source of fluorine for a known period of time. This period of time can be predetermined by experimentation according to the reaction conditions and fluorine source. Typically, the exposure time to fluorine in a reaction vessel is within the range of from about 1 to about 168 hours. More usually, the time is in the range of about 8 to about 48 hours, and more preferably is in the range of about 12 to about 36 hours, or about 12 to about 24 hours and preferably is from about 12 to about 18 hours. In certain cases, the fluorine source can effect fluorination in as little as about 1 to about 12 hours.

The structural integrity of the graphene sheet used in the preparation of the FG of the invention can be important in some applications (such as in electronic applications) but not in other applications (such as in the preparation of composite materials like FP composites). The FG of the present invention ranges from small, 'distorted' pieces of graphene to the 'perfect' i.e. substantially defect-free sheet of perfluorographane having a high fluorine:carbon ratio.

In some embodiments, in cases where the structural integrity is important, the graphene sheet is preferably substantially free from defects including dislocations. This ensures that the reaction proceeds smoothly and that the resulting product is also substantially free from defects. The reaction can be performed on more 'defective' graphene but the resulting FG also will then contain a corresponding proportion of defects. The structural integrity of the graphene and FG can be determined by inspection using transmission electron microscopy (TEM). The level of defects and dislocations observed is preferably less than 20% otherwise the material is discarded and not used in the fluorination reaction. In some embodiments, it is preferred that the level of defects and dislocations is less than 10%, more preferably less than 5% or less than 2% or 1%, and most preferably less than 0.1%. A corresponding level of defects is required in the FG product when it is intended for defect-sensitive applications.

In other embodiments, in applications where the presence of defects is not critical to the performance of the material, it is acceptable to have a significant proportion of defects in the graphene sheet used to prepare the FG. In such cases the defects may account for up to about 50% of the material. Certain electronics applications, for example those in which the band gap is a less important property of the material, may utilize a more 'defective' form of FG such as that containing over 20% and possibly even greater than 50% defects without serious adverse effects.

Graphene consists of a hexagonal monolayer network of sp2-hybridized carbon atoms. The properties of graphene were expected to be outstanding, based on calculations addressing graphene as the parent material for carbon nanotubes. The same appears to be true for the fluorographene (FG) of the invention. Some of the predicted extraordinary properties can be observed at an extremely low defect concentration which is possible because of the high formation energies of point defects in FG. Nevertheless, like in any other real material, structural defects can exist in FG and can dramatically alter its properties. For example, the scattering of electron waves at defects can have an enormous influence on the electrical conductivity. Defects can also be deliberately introduced into this material, for example, by irradiation or chemical treatments.

In some embodiments, besides being truly two-dimensional, FG can host lattice defects in reconstructed atom arrangements that do not occur in any other conventional material. This is partly due to different possible hybridizations of carbon that allow different numbers of nearest neighbors and hence lead to the occurrence of different stable structures for carbon itself such as graphite, and diamond. Perhaps even more importantly, sp2-hybridized carbon atoms arrange themselves into a variety of different polygons, and significantly not only hexagons, to form different structures. The non-hexagonal rings may either introduce curvature in the sheet or leave it flat when the arrangement of polygons satisfies certain symmetry rules. This property does not appear in other bulk crystals such as in silicon semiconductors. The reconstructions in the atomic network permit a coherent defective lattice without under-coordinated atoms. Although they have no unused bonds, these reconstructed defects locally increase the reactivity of the structure. Defects in three-dimensional crystals are referred to as intrinsic when the crystalline order is perturbed without the presence of foreign atoms. The latter are denoted as impurities and constitute extrinsic defects. In macroscopic crystalline materials, intrinsic defects have different dimensionalities. Point defects, typically vacancies or interstitial atoms, are zero-dimensional, whereas the concept of dislocations is based on one dimensional lines of defects. Grain boundaries or stacking faults extend in two dimensions, while inclusions and voids have a finite size in all three dimensions. Foreign atoms may exist as zero-dimensional defects when they substitute individual atoms of the crystal or are located on interstitial sites. In the case of FG, the defects are intrinsic defects.

In some embodiments, the reaction may be monitored in real time to determine a suitable period of time, i.e. the known time for exposure of the graphene sheet to the source of fluorine. In an alternate embodiment, the known period of time is a period of time which is pre-determined in accordance with the knowledge of the reaction and the conditions. In this case, the pre-determined time is a time within the range of about 8 to about 168 hours. More usually the time is in the range of about 8 to about 48 hours, and more preferably is in the range of about 12 to about 36 hours, or about 12 to about 24 hours.

In some embodiments, the source of fluorine is xenon difluoride. Other convenient solid sources of fluorine include transitional metal fluorides, such as $CoF_3$, $MnF_3$, $CrF_4$, $AgF$, $AgF_2$, $ZnF_2$, $HgF_2$ and the main-group fluorides $AlF_3$, $PbF_2$, $PbF_4$, $SbF_3$, $TlF$, $BiF_5$. In another embodiment liquid fluorinating agents are preferred, including the interhalogen fluorides $BrF_3$, $IF_5$, $BrF_5$ and $IF_7$, $AsF_3$, $SbF_5$ and $SeF_4$. In an alternative embodiment gaseous fluorinating agents may be used, such as elemental fluorine, $ClF$, $ClF_3$, $BF_3$, $NF_3$, $PF_3$, $PF_5$, $SiF_4$, $SF_4$, $SOF_2$, $SOF_4$, $SO_2F_2$, and $COF_2$. It is also possible to use combinations of two or more of the above, such as mixed metal fluorides. In some cases, it is also possible to generate some of these fluorine sources indirectly, e.g. from an oxide and HF at high temperature in an analogous manner to that used to prepare hydrofluorocarbons etc.

In some embodiments, the temperature of the reaction is in the range from about 70° to about 450° C. In one preferred embodiment, the reaction is carried out at a temperature from about 200° to about 450° C. In an alternate embodiment, the reaction is carried out at a temperature from about 70° to about 200° C. The reaction may also be carried out at around or just above room temperature i.e. in the range from about 20° to about 70° C.

In some embodiments, the reaction is performed at elevated pressure. Typically, the pressure is from about 5 bar to about 150 bar. More usually the reaction is carried out at a pressure from about 10 to about 100 bar, and more preferably at a pressure from about 50 to about 100 bar. In some cases, the reaction may also be carried out at around or just above ambient pressure i.e. in the range from about 1 bar to about 10 bar. Thus the reaction is possible over a wide temperature and/or pressure range.

In some embodiments, it may be important to control carefully the reaction conditions since the optimum reaction conditions represent a careful balance between ensuring that the reaction progresses properly and ensuring that de-fluorination of the product does not occur at a faster rate than the reaction progresses. In this case it becomes impossible to obtain fluorographene according to the invention. Surprisingly, it has been shown that the process conditions disclosed herein allow fluorographene to be prepared reliably and repeatably. One skilled in the art will appreciate that the material is that a partially fluorinated graphene can be relatively unstable, and can lose fluorine easily rendering it problematic to accomplish the fluorination reaction to any significant degree.

Previous attempts by others of fluorination of graphene were unsuccessful and did not lead to pure fluorographene. This may be due to the fact that the starting material was not graphene or graphite but graphite oxide because of the expected problems of working with graphene itself. Consequently, after fluorination the fluorinated samples comprise oxygen and the resulting chemical composition of the compound is ~COF (similar to graphite oxyfluoride). The material is thus neither pure nor particularly useful since the material is likely to be inhomogeneous.

Partially fluorinated graphene i.e. with a stoichiometry of less than 0.50 to 1.0 is a disordered non-stoichiometric compound. This is structurally and electronically different from the stoichiometric crystalline fully fluorinated graphene of the present invention. For example, partial fluorinated graphene does not have a well defined energy gap and conducts current to a lesser extent at room temperature in comparison to room temperature insulating CF.

Fluorographene of the present invention, having a high stoichiometric ratio i.e. .e. with a fluorine:carbon ratio of 0.50:1 or more, is therefore suitable for optoelectronic and electronic applications where known graphene-derived materials are not. In some embodiments, the higher fluorine content of the material of the invention is also more beneficial in applications including protective coatings, high performance sealing etc.

According to some embodiments of the present invention, stable fully functionalised graphene derivative can be produced in the form of fluorographene. The functionalized graphene was shown to be stable at room temperature and surprisingly does not suffer from loss of fluorine atoms.

In some cases, incomplete fluorination leads to a product which is not as stable as fully fluorinated graphene and which tends to lose atomic fluorine. In some embodiments, stable high stoichiometry FG i.e. with a fluorine:carbon ratio of 0.50:1 or more are produced. High stoichiometry FG are stable to loss of fluorine. In some embodiments, the total fluorine content should be at least 85% of the theoretical 1:1 stoichiometry that is achievable, and more normally is at least 90% of this value in order to ensure that the product is stable. This also ensures that the resulting product is free from dislocations and defects to the extent required.

The material and process of the present invention is not particularly limited by scale. The FG of the present invention may thus be prepared at one extreme from material such as graphene sheets having nanoscale dimension i.e. sheets only from 1 to 5 nm in upwards by from 1 to 5 nm upwards to at the other extreme bulk material having mm or cm dimensions. In some embodiments, 10 nm plates or larger are produced, i.e. with at least on dimension having a size of 10 nm or greater with the other dimension of the sheet or plate being larger than this, for example 50 nm or greater. The material may also be of large dimensions i.e. effectively a continuous sheet in which edge effects become unimportant.

Fluorinated graphene is referred herein in general term as fluorographene (FG). One can also consider fully fluorinated (FF) graphene as a two-dimensional (2D) counterpart of either PTFE, that is FF 1D carbon chains, or graphite fluoride (GrF), a 3D compound used in batteries and as a lubricant [Ruff, V. O. & Bretschneider, O. Die reaktionsprodukte der verschiedenen Kohlenstoffformen mit Fluor II (Kohlenstoffmonofluorid). *Z. Anorg. Allg. Chem.* 217, 1-18 (1934) and Watanabe, N., Nakajima, T. & Touhara, H. *Graphite fluorides* (Elsevier, Amsterdam, 1988)]. In some embodiments, the FG can be used in applications similar to known applications of PTFE and GrF.

The process of converting graphene to fluorographene, according to one embodiment, is illustrated in FIG. 1. In step 1, graphene crystals are cleaved onto an oxidized Si wafer (300 nm of $SiO_2$) and covered with a thin polymer layer (100 nm of PMMA). In step 2, this layer with graphene attached is lifted off by etching $SiO_2$ in 3% KOH. The film is picked up in solution onto a TEM grid. Then, PMMA is removed in acetone by using a critical point dryer (step 3). The optical micrograph shows a Quantifoil-Au grids. The size of the Quantifoil mesh is 7 µm, and graphene covers the whole Au cell. In step 4, graphene is fluorinated. The procedure can be carried out in a glove box to avoid any moisture resulting in HF. The inset for step 4 shows a TEM micrograph of one Quantifoil cell fully covered with FG. Its presence can be witnessed as small dust particles within the aperture. For transport experiments, FG is transferred onto an oxidized Si wafer. Microfabrication procedures including electron-beam lithography can then be employed to make devices (steps 5, 6).

The processing chart to obtain FG samples according to one embodiment is shown in FIG. 1. In brief, large graphene crystals (>100 im in size) were prepared by using the standard cleavage technique [Novoselov, K. S., Jiang, D., Schedin, F., Booth, T. J., Khotkevich, V. V., Morozov, S. V. & Geim, A. K. Two-dimensional atomic crystals. *Proc. Natl. Acad. Sci. USA* 102, 10451-10453 (2005)]. Because $XeF_2$ rapidly etches Si and easily diffuses through even a thick layer of amorphous SiO$_2$, it appeared impossible to use the Si wafer in the fluorination procedures. Keeping in mind the necessity of using a chemically inert support and the fact that complete fluorination requires the exposure of graphene from both sides, the cleaved crystals are transferred onto Au grids used for transmission electron microscopy (TEM). To provide sufficient support for graphene (that becomes more fragile after fluorination), Au grids covered with Quantifoil, a lithographically patterned polymer film are used (see FIG. 1). The samples are then placed in a PTFE container with XeF$_2$ and heated to 70° C. (the elevated T speeded up the reaction; the use of even higher T destroyed the grids).

The temperature of reaction is an important factor in the conduct of the process. In some embodiments, the temperature can be selected to represent a balance between the advantage of increased kinetics at higher temperature, the disadvantage of greater product instability, and the need to provide conditions that enable the reaction to progress sufficiently. In some embodiments, the reaction is conducted efficiently within the temperature range of 50 to 400°. Temperatures of 70 to 200° C. or 200 to 450° C. can be employed. In preferred embodiments, the temperature in the range of 200 to 400° C.

The resulting samples can be used for Raman, TEM and optical studies and probed by atomic force microscopy (AFM). Raman, optical, electron microscopy, mechanical and transport studies showed to the resulting compound is a semiconductor with a gap of $\approx$3 eV and a lattice constant slightly ($\approx$1%) larger than in graphene. Fluorographene exhibits Young's module of $\approx$100 N/m and an impressive breaking strength of $\approx$15 N/m.

Unlike hydrogenated graphene, fluorographene is strongly insulating (resistivity>$10^{12}\Omega$) and stable not only under ambient conditions but at temperatures up to 400° C. The stable semiconducting counterpart of graphene expands the range of possibilities offered by the parent material, allowing it to be modified to meet specific requirements in, for example, electronic and optoelectronic applications.

For electrical characterization, FG was transferred from TEM grids back onto an oxidized Si wafer. The latter was done by pressing the grids against the wafer or by using a capillary transfer method such as that described in Meyer, J. C., Girit, C. O., Crommie, M. F. & Zettl, A. Hydrocarbon lithography on graphene membranes. *Appl. Phys. Lett.* 92, 123110 (2008). In several experiments discussed below, graphene was also fluorinated directly on quartz and SiC wafers and studied without further transfer.

Figure 2:
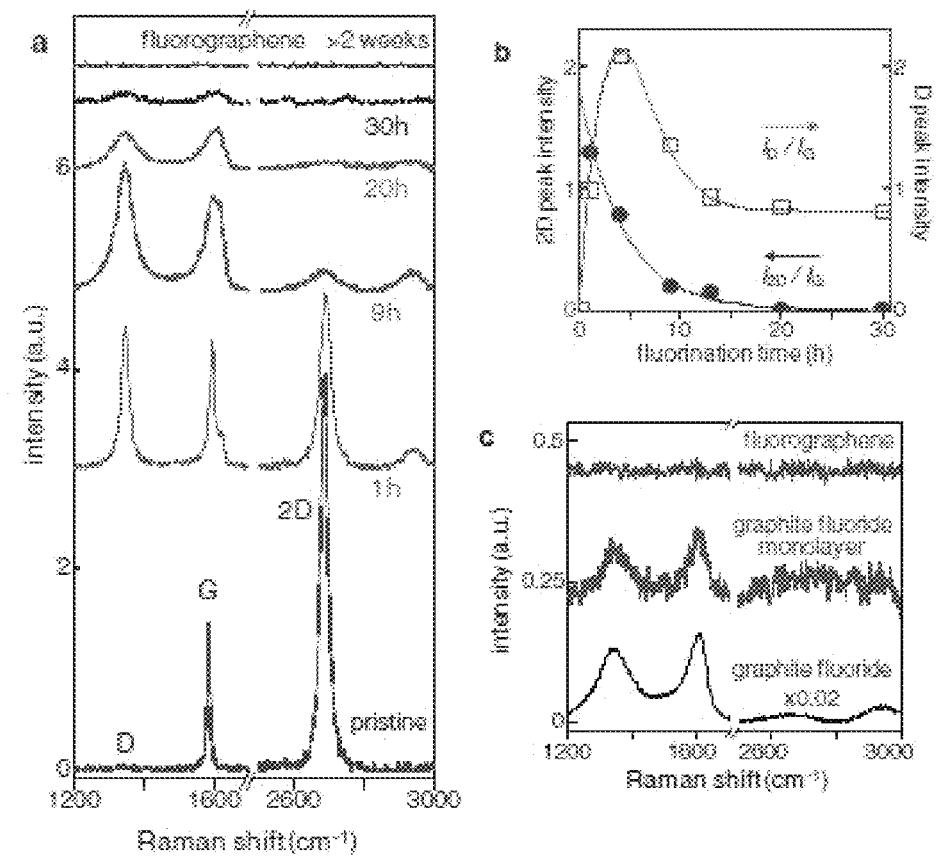
FIG. 2 shows Raman signatures of FG. (a)—Evolution of the spectra for a graphene membrane exposed to atomic F and measured each time under the same Raman conditions (laser wavelength 514.5 nm). The curves are shifted for clarity. (b)—Intensities of the D and 2D peaks (normalized with respect to the G peak intensity) as a function of fluorination time. Solid curves are guides to the eye. (c)—Comparison of the FF membranes with GrF and its monolayer. The measurements were done under the same conditions. The curves are shifted for clarity, and the one for GrF is scaled by a factor of 50.

The evolution of graphene's Raman spectra due to its consecutive exposures to atomic F is shown in FIG. 2. One can see that first a prominent D peak emerges. This indicates the appearance of atomic scale defects on the graphene lattice. As the fluorination time increases, the double-resonance band (usually referred to as 2D or G' peak) disappears whereas the ratio of D and G peaks' intensities remains approximately the same.

The saturation is achieved after approximately 20 hours, and little changes occur with further fluorination (FIG. 2b). This behavior is radically different from the one observed for hydrogenated graphene, in which case the 2D band always remained strong, and indicates more dramatic changes induced by fluorination. Partially fluorinated graphene (10 to 20 h) exhibits the Raman spectra that resemble those of GO that also has comparable intensities of the G and D peaks and a relatively small 2D band.

However, if graphene membranes are fluorinated sufficiently long, the 2D peak completely disappears, and the G and D peaks become much smaller than in GO under the same detection conditions. Therefore, employing the correct reaction conditions is an important part of the process. The duration of reaction is a factor in ensuring substantially complete fluorination occurs (in this context, this refers to fluorination at the level of at least 85% of the theoretical maximum). The reaction must be conducted for a period from 8 to 168 hours, and preferably for from 12 to 24 hours. A time of 20 to 24 hours is convenient.

FIG. 2c compares the Raman spectra of FF graphene with those of GrF and a monolayer extracted from the latter. One can see that within the noise level all three spectra are practically identical as expected. The 2D peak is strongly suppressed or absent, and the intensities of G and D peaks are approximately equal in all cases. The 50 times stronger signal in GrF is attributed to cumulative contributions from many atomic layers. The only reproducible feature found to distinguish FG and GrF is a small peak at 2575 cm$^{-1}$, which origins remain unclear. FIG. 2 clearly shows that the principal difference between the Raman spectra of graphene and FG/GrF is the strong suppression of all Raman signatures in the latter materials. This can be explained by the fact that fully fluorinated graphene becomes transparent for visible frequencies. Indeed, according to theory, GrF should have Eg$\approx$3.5 eV (that is, larger than green laser energy), even though the gap has not been measured, probably because the material usually comes in the form of an opaque white powder.

In some embodiments, the fluorographene of the invention has completely different properties in comparison to starting graphene (C). For example, the fundamental material properties like band gap, atomic structure, mechanical strength, chemical composition, and resistivity of the FG of the presently disclosed embodiments are significantly different from known materials.

Structure of FG

Figure 3:
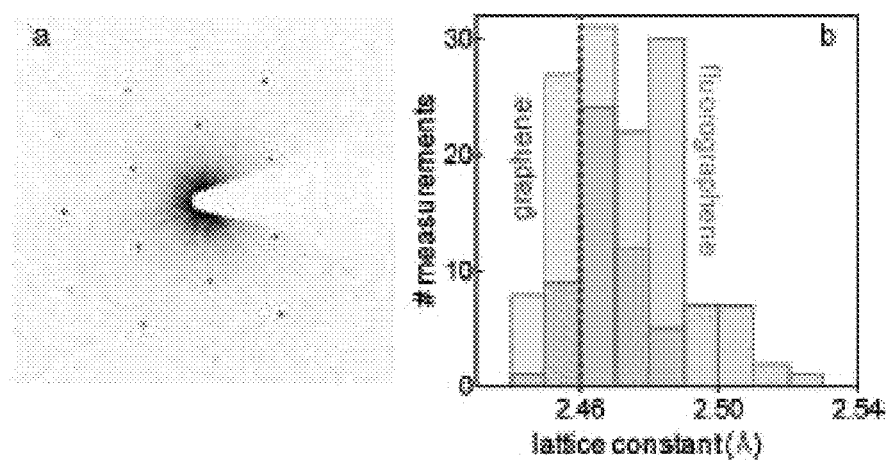
FIG. 3 shows transmission electron microscopy of FG. (a)—Diffraction pattern from a FG membrane. (b)—Lattice constant d measured using micrographs such as shown in (a). For comparison, similar measurements were taken for membranes before fluorination (left histogram). The dotted line indicates d for graphite.

Structural information about FG can be obtained by using TEM. FIG. 3a shows an exemplary electron diffraction micrograph for a FG membrane. The image yields substantially perfect hexagonal symmetry and is similar in quality to those observed for pristine graphene. This may account for the unexpected stability of fluorographene.

The unit cell of FG is slightly expanded with respect to graphene's cell, in contrast to the case of hydrogenated graphene that showed a compressed lattice. FG's lattice was found the same for all the studied FG membranes and its expansion was isotropic (no axial strain [Elias, D. C., Nair, R. R., Mohiuddin, T. M. G., Morozov, S. V., Blake, P., Halsall, M. P., Ferrari, A. C., Boukhvalov, D. W., Katsnelson, M. I., Geim, A. K. & Novoselov, K. S. Control of graphene's properties by reversible hydrogenation: Evidence for graphane. *Science* 323, 610-613 (2009)]).

FIG. 3b shows histograms for the lattice constant d in graphene and FG. The spread in the recorded values is due to a limited accuracy of TEM in precision measurements of d. Nonetheless, one can clearly see that FG has a unit cell approximately 1% larger than graphene, that is, d$\approx$2.48 Å. The observed increase is smaller than that in GrF where the reported d are larger than in graphite by 2.8 to 4.5% [Cheng, S. H., Zou, K., Gutierrez, H. R., Gupta, A., Shen, N., Eklund, P. C., Sofo, J. O., Zhu, J., Okino, F. Reversible fluorination of graphene: towards a two-dimensional wide bandgap semiconductor. arxiv:1005.0113 (2010), Kita, Y., Watanabe, N. & Fujii, Y. Chemical composition and crystal structure of graphite fluoride. *J. Am. Chem. Soc.* 101, 3832-3841 (1979) and Touhara, H., Kadono, K., Fujii, Y. & Watanabe, N. On the structure of graphite fluoride. *Z. Anorg. Allg. Chem.* 544, 7-20 (1987)]. The smaller d in FG is probably due to the possibility for the 2D sheet to undergo strong interatomic corrugations if out-of-plane displacements of carbon atoms are not restricted by the surrounding 3D matrix.

Stability of FG

In some embodiments, the FG of the present invention is thermally stable. In some embodiments, the FG of the present invention has a thermal stability comparable to PTFE. In other words, the FG of the invention is stable at elevated temperatures. Similar methods of characterizing FPs are widely known in the art and used in academic literature. For practical purposes, the FG can be characterized in terms of its continuous use temperature. This can be defined as the temperature at which 50% of properties are lost after a defined time. In some embodiments, the FG exhibits a continuous use temperature of at least 100° C., and more preferably at least 150° C., and most preferably at least 200° C.

The Raman signatures for complete and partial fluorination shown in FIG. 2a allowed for the study the FG stability at elevated temperatures T and with respect to exposure to various chemicals. For graphene fluorinated only for a few hours, the process was found to be largely reversible, similar to the case of hydrogenation, so that a short annealing at 250° C. in an argon hydrogen mixture (with 10% $H_2$) could restore membranes to their nearly pristine state with only a little D peak left. After more extensive fluorination (>20 h), the annealing even at 450° C. could not restore the 2D peak but the D and G peaks notably grew and, after 24 h, became similar in intensity to those on, for example, the middle curve in FIG. 2a, which indicates that a significant amount of fluorine remained attached to the carbon scaffold. For FF graphene, the Raman spectra did not change for T up to 200° C. and losses of F became noticeable only for annealing above 400° C.

In some embodiments, the thermal stability of FG is higher than that of GrF and similar to PTFE. The GrF fully decomposes already at 300° C. The higher stability of FG can be attributed to the practical absence of structural defects in FG and little strain. PTFE undergoes some slow decomposition at T>260° C. and its rapid decomposition occurs only above 400° C. [Conesa, J. A. & Font, R. Polytetrafluoroethylene decomposition in air and nitrogen. *Polym. Eng. Sci.* 41, 2137-2147 (2001)]. Transport measurements are sensitive to minor compositional changes (indicating none below ~200° C.) while the Raman spectra discussed above revealed significant F losses only above 400° C. These characteristics are similar to those of PTFE.

In some embodiments, the FG of the invention are stable in liquids such as water, acetone, propanol, chemicals common for lithography processing, etc. and under ambient conditions. The chemical stability seems similar to that of graphite fluoride and PTFE. Stability of digraphite fluoride ($C_2F$), a stage II intercalation graphite compound was investigated for the sake of comparison. This material allowed relatively easy exfoliation but was shown to be unstable in any of the above liquids. Its single- and few-layer crystals were unstable even under ambient conditions, reducing rapidly to the state similar to strongly damaged graphene or reduced GO. Further information about FG's stability can be obtained in transport experiments discussed below.

Optical Properties of FG

In some embodiments, the FG of the invention exhibits improved optical properties with respect to graphene such as optical transparency. In some embodiments, the FG of the invention exhibits optical properties of a wide gap semiconductor.

Figure 4:
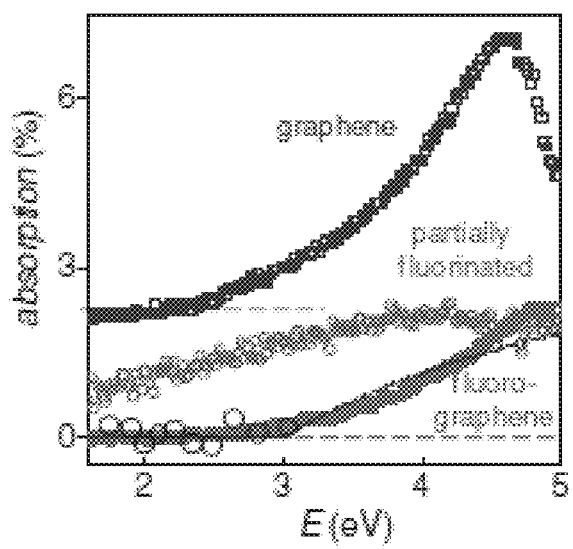
FIG. 4 shows the changes in optical transparency of graphene due to fluorination.

FIG. 4 illustrates embodiments of optical properties of FG of the invention and the changes in optical transparency of graphene due to fluorination. The upper curve is for graphene and, within experimental error, follows the low-E data of ref. Nair, R. R., Blake, P., Grigorenko, A. N., Novoselov, K. S., Booth, T. J., Stauber, T., Peres, N. M. R. & Geim, A. K. Fine structure constant defines visual transparency of graphene. *Science* 320, 1308-1308 (2008). Beyond the previously reported range (<3 eV), graphene exhibits an absorption peak in ultraviolet [Kravets, V. G., Grigorenko, A. N., Nair, R. R., Blake, P., Anissimova, S., Novoselov, K. S. & Geim, A. K. Spectroscopic ellipsometry of graphene and an exciton-shifted van Hove peak in absorption. *Phys. Rev. B* 81, 155413, (2010)]. Partially fluorinated graphene shows higher optical transparency (middle curve). FF graphene is transparent for $E \leq 3$ eV but start absorbing violet light. Large open circles are for FG membranes on TEM grid that were assessed by the narrow-filter microscopy used in ref. Nair, R. R., Blake, P., Grigorenko, A. N., Novoselov, K. S., Booth, T. J., Stauber, T., Peres, N. M. R. & Geim, A. K. Fine structure constant defines visual transparency of graphene. *Science* 320, 1308-1308 (2008). The dashed lines indicate zero and $\pi\alpha$ opacities. The solid curve is the absorption behavior expected for a 2D semiconductor with Eg=3 eV.

The weak, nearly absent Raman signal in FG has hinted at its high optical transparency. FIG. 4 extends this qualitative suggestion by showing absorption spectra of pristine, partially and FF graphene. The measurements were done for graphene deposited onto quartz wafers and then fluorinated in $XeF_2$ at 70° C., which did not damage quartz in a moisture-free atmosphere. This method allowed to obtain large crystals (>100 μm in size) suitable for standard optical spectroscopy. The crystals' transparency was measured with respect to the wafer.

The upper curve in FIG. 4 is for pristine graphene. For light energies E<2.5 eV, it exhibits a flat absorption spectrum abs (E) with a "universal opacity" of $\pi\alpha \approx 2.3\%$ where a is the fine structure constant. Strong deviations from this universality take place in blue, and graphene's opacity triples in peak at 4.6 eV. This is due to the fact that graphene's electronic spectrum is no longer linear at energies close to the hopping energy of $\approx 2.5$ eV [Nair, R. R., Blake, P., Grigorenko, A. N., Novoselov, K. S., Booth, T. J., Stauber, T., Peres, N. M. R. & Geim, A. K. Fine structure constant defines visual transparency of graphene. *Science* 320, 1308-1308 (2008) and Stauber, T., Peres, N. M. R. & Geim, A. K. Optical conductivity of graphene in the visible region of the spectrum. *Phys. Rev. B* 78, 085432 (2008)] and exhibits a pronounced van Hove singularity in the density of states. Note that the peak is clearly asymmetric with a low-E tail, which is attributed to excitonic effects.

For graphene fluorinated on quartz, its state was first assessed by Raman spectroscopy. Although F should be able to diffuse between graphene and quartz [Watanabe, N., Nakajima, T. & Touhara, H. *Graphite fluorides* (Elsevier, Amsterdam, 1988)], the concentration of atomic F underneath the graphene sheet is probably limited by its recombination into less reactive $F_2$. Accordingly, it required several days to reach the fluorination state similar to that achieved after 9 hours for graphene membranes (see FIG. 2a). The partially fluorinated graphene exhibited enhanced transparency with respect to graphene over the whole E range (FIG. 4) and, for visible light, its opacity fell down to $\approx 0.5\%$. Because impurity scattering is not expected to result in any significant decrease in optical conductivity, the enhanced transparency of the partially fluorinated state can only be explained by a gap that opens in graphene's electronic spectrum. The remnant absorption can be attributed to microscopic regions that remain non-fluorinated, similar to the case of GO.

After several weeks of fluorination, the Raman state that corresponded to the upper curve in FIG. 2a was achieved. The fully fluorinated (FF) state was found to be fully transparent at visible frequencies and started absorbing light only in blue (lower curve in FIG. 4) determining that the FG of the invention is a wide gap semiconductor. The result was confirmed using the technique described in Nair, R. R., Blake, P., Grigorenko, A. N., Novoselov, K. S., Booth, T. J., Stauber, T., Peres, N. M. R. & Geim, A. K. Fine structure constant defines visual transparency of graphene. *Science* 320, 1308-1308 (2008), which analyzed images obtained in an optical microscope by using a set of narrow-pass filters. This approach can limit the measurements to the visible spectrum but allows spectroscopy of small graphene membranes that were obtained directly on a TEM grid and extensively fluorinated. No opacity was detected for these samples at all frequencies accessible by the microscopy approach (large symbols in FIG. 4).

Figure 12:
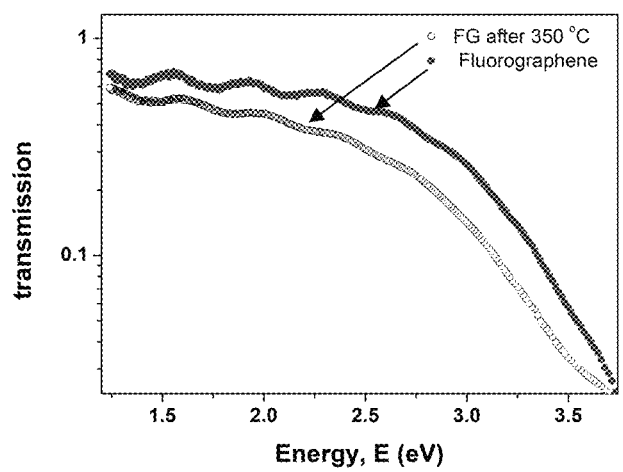
FIG. 12 shows the variation of optical transmission of pristine and annealed FG as a function of energy E.
Figure 13:
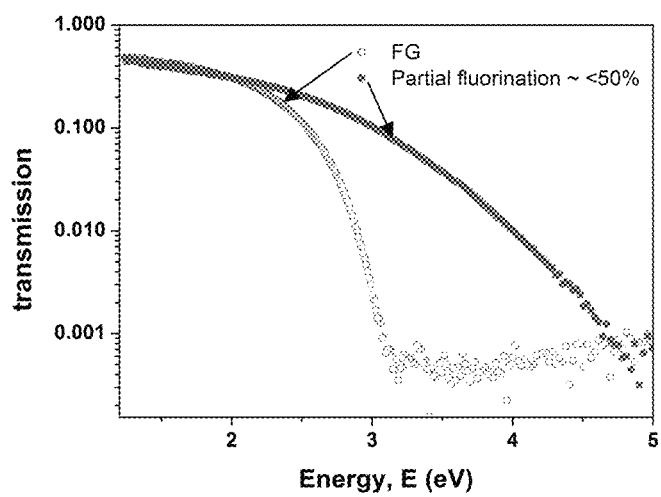
FIG. 13 shows optical transparency of fully fluorinated and partially fluorinated graphene as a function of Energy E.

In some embodiments, unlike bulk semiconductors, the 2D materials of the invention remain partially transparent even at energy E above the gap energy. In some embodiments, the FG of the invention provides for a stable band gap. For example, as illustrated in FIG. 12, variation of the optical transmission of pristine and annealed FG was investigated and showed that the observed band gap ~3 eV is stable after annealing at 350° C. in argon. FIG. 13 shows the variation of optical transmission with energy for fully and partially fluorinated graphene. The opacity of FG above 3 eV is the characteristic of the bandgap. The variation of optical transmission with energy for partially fluorinated graphene is significantly different from that of FG and doesn't show any clear bandgap.

Insulating Properties of FG

Figure 5:
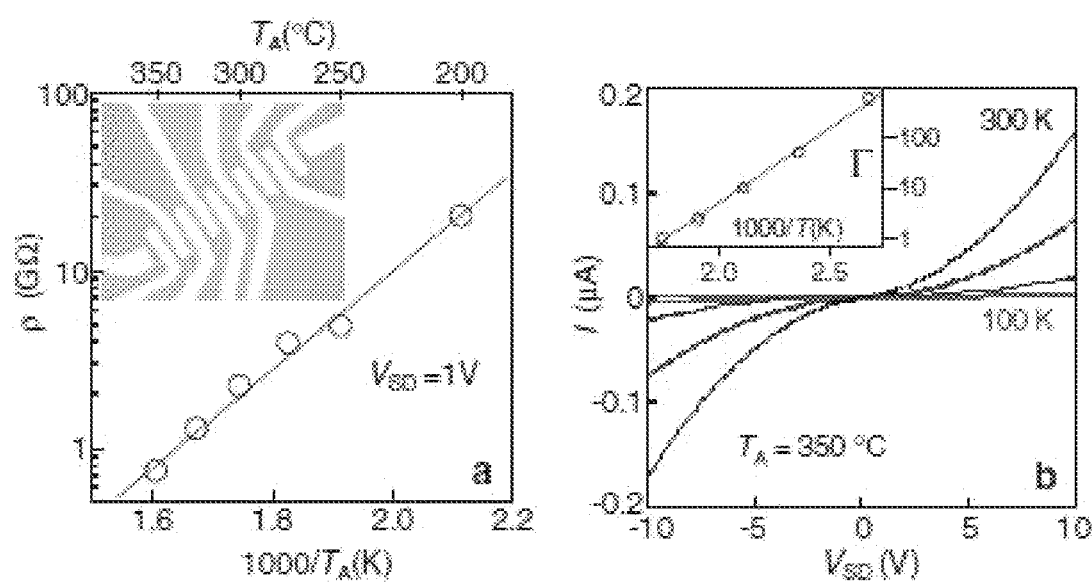
FIG. 5 shows a stable wide-gap 2D semiconductor. (a) Changes in FG's ρ induced by annealing. (b) I-V characteristics for the FG device annealed at 350° C.

In some embodiments, the FG of the present invention is insulating. In some embodiments, electron transport in fluorinated graphene was investigated to assess the electronic properties of FG. As illustrated in FIG. 5, samples were transferred from Quantifoil onto an oxidized Si wafer and multi-terminal devices were made FIG. 5 shows a stable wide-gap 2D semiconductor. (a) Changes in FG's $\rho$ induced by annealing. No changes could be detected at $T_A$ up to 175° C. At higher $T_A$, FG resistivity falls below $10^{12} \Omega$ and becomes experimentally measurable. Because of nonlinear I-V characteristics, the plotted $\rho$ values were recorded for a fixed bias $V_{SD}$ of 1V (circles). In some embodiments, for any given $T_A$, approximately 1 h is required to reach a saturated state. The solid line is the exponential dependence yielding $_{Edes} \approx 0.65$ eV. The inset shows a device made with FF with the distance between adjacent contacts of 2 μm. (b) I-V characteristics for the FG device annealed at 350° C. The curves from flattest to steepest were measured at T=100, 150, 200, 250 and 300 K, respectively. The scaling factor Ã is plotted in the inset. The solid line is the best fit by $\exp(E_h/T)$.

In some embodiments, weakly fluorinated graphene has insulating properties. For example, weakly fluorinated graphene with Raman spectra similar to the 1 h curve in FIG. 2a was found to be highly insulating, exhibiting room-T resistivity $\rho$ in the MOhm range, that is, three orders of magnitude higher than graphene. This clearly distinguishes fluorination from hydrogenation, with the latter resulting in little increase in $\rho$ at room temperature T. The devices made from FF graphene showed no leakage current at biases $V_{SD}$ up to 10 V (within the detection limit of ~0.1 nA due to parasitic conductivities). Taking into account that the devices had typical width-to-length ratios of 10 to 100, this sets a lower limit on FG's $\rho$ of $>10^{12}$ Ohm at room T. Such a highly insulating state is in agreement with the wide gap opened in FG's electronic spectrum.

Figure 6:
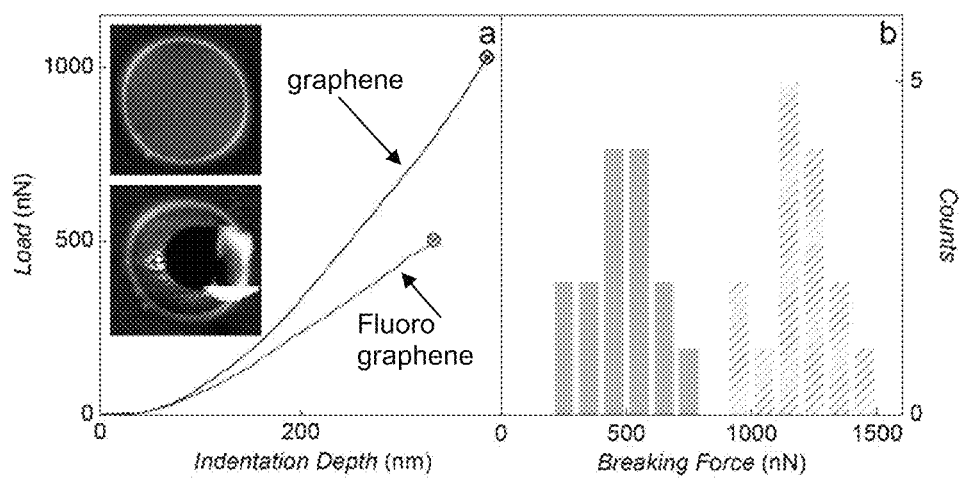
FIG. 6 shows the mechanical properties of FG. (a)—Examples of the loading curves for graphene and FG membranes. Fracture loads are marked by the circled crosses. Top and bottom insets: AFM images of a FG membrane before and after its fracture, respectively. (b) Histogram for the breaking force for graphene (hashed) and FG (solid color). All the membranes (15 of each type) were on identical Quantifoils and punched by the same AFM tip with a radius of ≈15 nm as measured in SEM.

Electrical measurements allowed for the study thermal stability of FG in more detail than the Raman spectroscopy allowed. FIG. 6a shows changes in its electrical conductivity induced by annealing at different temperature $T_A$ in argon-hydrogen atmosphere. No current could be detected through FG after its prolonged annealing at $T_A$ up to 175° C. At higher $T_A$, FG became weakly conductive (see FIG. 5a), and at T as high as 350° C. its effective resistivity $\rho = V/I$ fell down to ≈1 GΩ if a large source-drain voltage $V_{SD}$ of 1 V is applied. This behavior is in agreement with the changes observed in Raman spectra due to annealing. The $\rho(T_A)$ dependence in FIG. 5a is well described by the functional form $\exp(E_{des}/T_A)$ with desorption energy $E_{des} \approx 0.65$ eV. The found $E_{des}$ is notably lower than the C—F bond energy of ≈5.3 eV, indicating that the initial desorption probably occurs from defective sites. The fact that decomposition is initiated at structural defects and strained regions is thought to be one of the reasons why to date it has not been possible to prepare substantially fluorinated graphene. The main problem, particularly at elevated temperatures was thought to be the fact that the rate of the decomposition reaction accelerates to the extent that the reaction could not proceed viably.

The electrical measurements of devices partially reduced by annealing further confirm that the material is a wide gap semiconductor. To this end, I-V characteristics of FG reduced at high T=350° C. were measured (FIG. 5b). They collapse on a single IV curve if scaled along the I axis (not shown). The found pre-factor Γ is plotted in the inset. The T dependence of Γ is well described by the activation dependence $\exp(E_h/T)$ with $E_h \approx 0.6$ eV. The value is smaller than the activation energy $E_g/2 \approx 1.5$ eV expected from optical measurements. This yields a broad band of impurity states inside the gap, which can be attributed to fluorine vacancies that appear during annealing. In some embodiments electron transport occurs via activation from the impurity band to the conduction or valance band, the mechanism common for semiconductors with a high density of deep dopants. In some embodiments, for the FF state (before annealing), the impurity band is expected to be narrower, which can result in higher $E_h$ and can suppress the conductivity beyond known detection limit.

Stiffness and Mechanical Strength

In some embodiments, the FG of the invention exhibits mechanical strength comparable of the mechanical strength of graphene. The FG on the invention can provide a Young's modulus E of about 100 N/m or 0.3 TPa. As a support for FG, Quantifoil is used with a periodic array of circular apertures (see the AFM image in FIG. 6a, inset). The experimental arrangements and analysis were similar to those described in Lee, C., Wei, X. D., Kysar, J. W. & Hone, J. Measurement of the elastic properties and intrinsic strength of monolayer graphene. *Science* 321, 385-388 (2008). In brief, an AFM tip was positioned above the center of a FG membrane and then moved down to indent it. The bending of the AFM cantilever was recorded as a function of its displacement, and the force acting on the membrane was then calculated from the cantilever's rigidity. FIG. 6a shows typical loading curves. As a reference, pristine graphene was used on identical Quantifoil grids. This allowed to crosscheck the results and avoid systematic errors due to finite rigidity of the polymer scaffold that also responded to the load. Analysis of the force-displacement curves has yielded Young's modulus E of FG≈100±30 N/m or 0.3 TPa, that is, FG is 3 times less stiff than graphene.

To measure FG's breaking strength, the membranes were indented until they collapsed (FIG. 6a). The observed values for the breaking force are collected in FIG. 6b. Both graphene and FG show similar histograms but graphene exhibits on average ≈2.5 times higher strength. This infers FG's intrinsic strength σ≈15 N/m if the previously determined strength is used (≈42 N/m) for pristine graphene. Both E and σ are extremely high in comparison with other materials. In some embodiments, FG can sustain approximately the same elastic deformation σ/E of ~15% than graphene. This can be seen directly from FIG. 6a where both membranes broke at similar indentations. The large breaking strength of FG and the fact that it supports so high strain prove its little damage during fluorination and the practical absence of structural defects, similar to the case of graphene.

Fluorographene Paper

In some embodiments, fluorographene paper was prepared to show scalability of the production of FG for various applications. Fluorinated graphene laminates of the types described above [Geim, A. K. Graphene: Status and prospects. *Science* 324, 1530-1534 (2009)] and graphene on SiC were used. Laminates were obtained by filter deposition from a graphene suspension that was prepared by sonication of graphite in an organic liquid as described in Hernandez, Y., Nicolosi, V., Lotya, M., Blighe, F. M., Sun, Z. Y., De, S., McGovern, I. T., Holland, B., Byrne, M., Gun'ko, Y. K., et al. High-yield production of graphene by liquid-phase exfoliation of graphite. *Nat. Nanotechnol.* 3, 563-568 (2008) and Blake, P., Brimicombe, P. D., Nair, R. R., Booth, T. J., Jiang, D., Schedin, F., Ponomarenko, L. A., Morozov, S. V., Gleeson, H. F., Hill, E. W., Geim, A. K., Novoselov, K. S. Graphene-based liquid crystal device. *Nano Lett.* 8, 1704-1708 (2008).

In some embodiments, to speed up the fluorination process that involves diffusion of F between graphene crystallites, the laminate to $XeF_2$ was exposed at 200° C. as this did not require a substrate (Au and quartz reacted with F at this T). 10 hours were sufficient to reach a saturated state that did not change with further fluorination. It should be noted that under the same experimental conditions, graphite could not be fluorinated (it requires higher T to produce GrF [Watanabe, N., Nakajima, T. & Touhara, H. *Graphite fluorides* (Elsevier, Amsterdam, 1988). This implies that thick crystallites still present in such laminates remained non-fluorinated.

Figure 7:
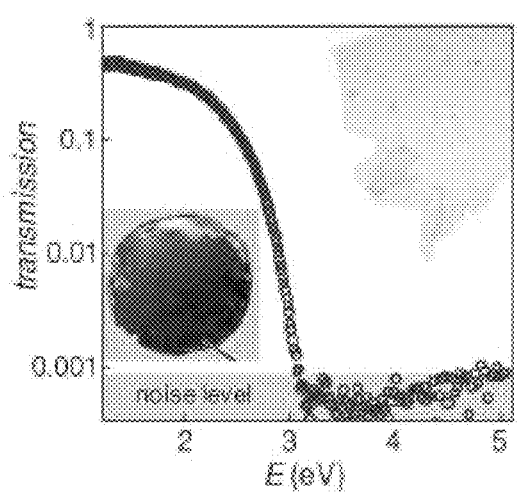
FIG. 7 shows the optical transparency of FG paper as a function of E for a 5 μm thick sample shown on the photo (inset). The sample size is approximately 1 cm. The gray area indicates detection limit of 0.1% of an incident light intensity.

In some embodiments, the fluorographene paper can be optically transparent. The FG of the invention provides for a wide gap material. FIG. 7 thus shows an optical photograph of a graphene laminate after its extensive fluorination. The resulting material is visually distinctive from the original one that is completely black with a metallic shine similar to that of graphite. In contrast, FG paper is transparent even at a thickness of several μm and has a brownish color that corresponds to absorption in violet. Thereby proving that FG is a wide gap material. The dark specks on the photograph are due to graphitic inclusions that could not be fluorinated. Except for the region with graphitic inclusions, FG paper exhibited the same Raman spectrum as FF membranes. The optical spectrum for FG paper is shown in FIG. 7. The light transmission exhibits an onset at ≈3.1 eV, in excellent agreement with the gap value inferred from the absorption spectra of individual FG crystals. The smaller gap in FG with respect to GrF (that is predicted to have $E_g$≈3.5 eV [Charlier, J. C., Gonze, X. & Michenaud, J. P. First-principles study of graphite monofluoride (CF)n. *Phys. Rev. B* 47, 16162-16168 (1993) and Takagi, Y. & Kusakabe, K. Transition from direct band gap to indirect band gap in fluorinated carbon. *Phys. Rev. B* 65, 121103 (2002)]) can be due to an atomically corrugated structure with the different lattice constant or excitonic effects. Although GO paper has a similar color, it absorbs considerably more light and becomes non-transparent already at submicron thicknesses. Furthermore, the spectrum in FIG. 7 is qualitatively different from the one of GO which shows no apparent gap. FG paper is mechanically fragile, presumably due to weak bonding between individual flakes, strongly hydrophobic (similar to graphite fluoride) and stable under ambient conditions and at elevated temperatures as expected from the measurement for individual FG crystals.

In some embodiments, the fluorographene of the invention is mechanically strong. Mechanically, FG is only 2-3 times weaker than record breaking graphene. Because FG is thermally and chemically stable, it is believed that its electronic quality can significantly be improved further to allow the electric field effect, which could in turn offer new venues for graphene electronics. FG can be used as a high-quality 2D insulator (for example, to create local insulating regions within graphene devices). Its use in optoelectronics that is less sensitive to the electronic quality is an enticing opportunity. The similarities between FG and PTFE, including insulating properties and thermal stability, invite to consider the 2D counterpart of PTFE for a wide range of technologies such as protective coatings, high performance sealing, electrets, etc., in which PTFE rather than graphite fluoride is used. More generally, FG adds to the small family of graphene-based derivatives (GO and graphane) and expands the growing family of 2D atomic crystals.

Fluorinated Graphene Composite Compounds

Aspects of the invention also provides a material that can be used as a reinforcing material in composite materials. We have found that the fluorographene of the present invention has mechanical properties that are similar to that of graphene i.e. very strong. This renders it useful in structural applications in addition to electronics applications. In some embodiments, the fluorographene of the present invention finds use in improving the thermal, electrical, chemical, mechanical properties of fluoropolymers (FP). Conventionally, FP interchain interactions are very weak but spread over the area of FG, FG is able to act as a very effective and compatible reinforcement. Conventionally, FPs are 'compounded' with glass and carbon and, although they remain weak relative to some composite materials, their particular properties nevertheless render them useful in a number of applications. The FG of the present invention provides a route to the improvement of traditional FG composite materials. Beneficially, the similarity of FG with FP means that FG can be compatible with and can be well dispersed throughout the FP. This can lead to a better fluoropolymer product with improved properties such as temperature performance and chemical resistance. In some embodiments, FG can be distributed by first mixing with aqueous colloidal dispersions. Modifications to the side chains on FP themselves (as in FEP or PFA) may also lead to some further beneficial effects and further improve the interaction between polymer and filler. Melting point, CUT and strength and modulus can vary for different FPs and for FPs having differing degrees of polymerization or partially fluorinated systems.

In PTFE the fluorine atoms form a close packed spiral around the carbon backbone. This creates a non polar, highly crystalline structure with very weak interchain interactions. PTFE has a low coefficient of friction and is recognized to be weak and soft relative to other performance polymers. A very high molecular weight is required to develop useful mechanical properties and this increases melt processibility. The melting point is high and PTFE is highly crystalline. This results in excellent chemical resistance. The C—F bond is very strong and oxidative stability is excellent.

In some aspects, the composite compound has a superior thermal and/or chemical resistance than the fluoropolymer. The poor mechanical properties can be improved by the introduction of hydrogen atoms. However this is at the expense of CUT, melting point and chemical resistance.

FEP typically contains a CF3 side chain. This improves mechanical properties for a given molecular weight—allowing improved melt processability. However melting point and CUT are reduced.

In some embodiments, the introduction of the FG of the invention into FPs represents an excellent means to circumvent these problems. In some embodiments, FG disclosed herein has the potential to improve the dielectric strength of other high temperature polymers i.e. polymers other than FPs. Many high temperature polymers contain phenylene groups and can readily degrade to carbon. Such polymers have limited dielectric strength, arc track resistance and tracking index. A composite version of a FP or other polymer containing a plate-like filler in the form of FG is believed to have potential in reducing this problem.

According to another aspect of the present invention, there is provided a functionalized graphene compound-polymer composite, wherein the functionalized graphene comprises graphene and fluorine, wherein the amount of fluorine bonded to graphene is at least 25 atom % of the theoretical maximum stoichiometry possible for a graphene fluorine compound. In some embodiments, the material will have an lower limit of 0.50:1 or more. The material, particularly when the ratio is from at least 0.25:1 to 0.50:1 or less may find utility in composite materials. However, higher stoichiometry fluorographen can also be used in composites.

According to a further aspect of the present invention, there is provided the use of a functionalized graphene compound-polymer composite, wherein the functionalized graphene comprises graphene and fluorine, wherein the amount of fluorine bonded to graphene is at least 25 atom % of the theoretical maximum stoichiometry possible for a graphene fluorine compound, as a structural material or as a coating.

The functionalized graphene compound can be used alone, or can be used in conjunction with one or more additional materials to form a composite material. The additional material may be a polymer. However, it is possible to mix the functionalized graphene compound with other substrates such as glass, metals, or alloys, ceramics or similar materials for the purposes of reinforcement etc. The composite material will have modified physical and/or mechanical properties as a result. For example, the fluorographene of the invention might provide reinforcement and/or alter the electronic properties of the bulk material.

There are a number of applications of FG as FG-polymer composite materials in the field of plastics materials. The FG-polymer composite of the invention may incorporate any plastics material. However, FPs are preferred as carriers for the FG on account of the compatibility and property enhancements relative to the basic materials on their own. However, the main resin types which are of particular interest are as follows:

PTFE: PTFE is a polymer consisting of recurring tetrafluoroethylene monomer units. Its formula is [CF2-CF2]n. PTFE does not melt to form a liquid and cannot be melt extruded or injection moulded. The virgin resin forms a coalescable gel at around 335° C. PTFE is sold as a granular powder, a coagulated dispersion/fine powder, or an aqueous dispersion. Each is processed in a different manner.

FEP: FEP fluorocarbon resin is a copolymer of tetrafluoroethylene and hexafluoropropylene with the formula [(CF(CF3)-CF2)x(CF2-CF2)y]n. It has a melting point range of 245°-280° C. and is melt processable. It is supplied in the form of translucent pellets, powder or as an aqueous dispersion.

PFA: PFA fluorocarbon resin is a copolymer of tetrafluoroethylene and a perfluorinated vinyl ether having the formula [(CF(ORf)-CF2)x(CF2-CF2)y]n where ORf represents a perfluoralkoxy group. PFA melts at 280° C. minimum and is melt processable. It is available in the form of translucent pellets, powder, and as an aqueous dispersion.

ETFE: ETFE is a copolymer consisting mainly of ethylene and tetrafluoroethylene, having the formula [(CF2-CF2)x-(CH2-CH2)y]n often modified with a small percentage of a third monomer. The melting range is typically 215° C. to 270° C. It is melt processable and is supplied in the form of pellets, powder and dispersions.

ECTFE: ECTFE is a copolymer of ethylene and chlorotrifluoroethylene having the formula [(CH2-CH2)x-(CFC1-CF2)y]n. It is often modified with a small percentage of a third monomer. Depending on the molecular structure, the melting range is 190-240° C. It is available in the form of translucent pellets and as a fine powder.

PVDF: PVDF is a homopolymer of vinylidene fluoride having the formula [CH2-CF2]n or a copolymer of vinylidene fluoride and hexafluoropropylene having the formula [CF(CF3)-(CF2)x(CH2-CF2)y]n. PVDF polymers melt at 160° C., are melt processable, and are supplied in the form of powder, pellets, and dispersions.

MFA: MFA is a random copolymer of tetrafluoroethylene and perfluoromethylvinylether. It belongs to the generic class of PFA polymers. MFA melts at 280° C. It is available in the form of translucent pellets and aqueous dispersions.

THV: THV is a terpolymer of tetrafluoroethylene, hexafluoropropylene, and vinylidene fluoride with the formula [CF(CF3)-CF2)x(CF2-CF2)V(CF2-CF2)z]n THV is melt processable with melting points from 120° to 230° C. depending on grade. It is available as pellets, agglomerates or aqueous dispersions.

According to some aspects, the fluorinated graphene-polymer compound of the invention provides for improved thermal resistance as compared to the polymer. One of the most important properties of fluoropolymers is resistance to heat. Combined with chemical resistance and excellent dielectric stability, the heat resistance of fluoropolymer resins yields an extremely versatile family of engineering materials. These unique properties may provide certain desirable performance characteristics needed in the event of fire, in fluid containment or exclusion, electrical overload and similar emergencies. However, combustion of these resins can produce toxic effluents.

Although fluoropolymers are amongst the most thermally stable polymers known, they will start to decompose slowly when heated to elevated temperatures. Published results can differ as to the exact temperature at which decomposition occurs. This reflects the difficulty associated with analyzing trace element emissions. However, significant decomposition occurs only above the recommended continuous use temperature.

The quantity of decomposition product remains small until temperatures above the normal processing temperature for the polymer are reached. Rates of thermal decomposition for fluoropolymers can be determined using a thermogravimetric analyzer. The temperature was increased at 20° C./minute from room temperature to the test temperature. The sample is then held at constant temperature for one hour and the weight loss during the hour is measured (isothermal weight loss). The rate of weight loss is determined at a series of constant temperatures appropriate to the thermal stability of the polymer under test.

Since FG can offset some the key limitations of fluoropolymers (FPs), it is important to note that there are applications which are outside the normal fluoropolymer range. FG may also enhance non-fluorinated systems. Accordingly, FG has may have utility in a wider range of classic applications of all the main classes of high performance engineering plastics and a number of lower performing resins. These include: polyethersulfones, polyetherimides, polyphthalamides, polyphenylenesulfides, polyaryletherketones, polyamideimides, polyimides, polybenzimidazoles, liquid crystalline polyesters, fluoropolymers, polyamides and polyesters. In addition, there are potential uses of FG in emerging technologies in the light of industry trends towards smaller, faster devices operating in more demanding environments.

In some embodiments FG (when it is not being used simply on its own to take advantage of its unique properties in applications such as electronics, optics or as a mechanical component) can be used as an additive to other materials which will act as its carrier. It is also possible for FG to be used as a coating in its own right or with the addition of small amounts of binder.

There are a number of different possible enhancements to the properties of underlying materials to which FG is being added. Which one or more enhancements, and the extent of any enhancement(s) depend on the nature of the other material and the amount of the FG added. Typically, FG will be added in an amount of from 0.01% to 10% by weight of the total weight of the composite material and more usually is about 0.01% to 5%. More preferably, the FG accounts for from 0.1% to 5% by weight of the composite material and most preferably 0.1% to 2.0%. In an alternate embodiment, the amount of FG added could range from 0.01% to as high as 95%. This might be the case when FG is used with just an amount of FP to act as a binder. In embodiments of this use, the upper limit may be 95%, 85%, 60%, 40% or 30%. The use of a binder is highly preferable in some cases.

The improvement in mechanical properties is an important aspect of the composite material of the invention. FG can act as a mechanical reinforcement because of its high strength and modulus. The efficiency of this reinforcement will depend on compatibility with the matrix, the dimensions of the FG and the distribution of the FG in the matrix. FG might be expected to reinforce not just FPs but also partially fluorinated polymers and other materials. Fatigue strength, creep and resistance to crack propagation can be substantially improved.

Another improvement in properties which is an important aspect of the composite material concerns its performance at elevated temperatures. The thermal performance of composites of the invention is enhanced by the presence of FG beyond what might be expected from mechanical reinforcement alone. The reason for this is not clear but it is considered that FG may also immobilize materials at a molecular scale, leading to an enhancement of Tg in the resins it reinforces.

Chemical resistance is a further improvement in properties which is an important aspect of the composite material of the invention. A composite containing FG is expected to have excellent resistance to a wide range of chemicals. It is likely to impart excellent barrier performance which will further enhance the chemical resistance of any resin to which it is added.

Similarly, radiation resistance of the composite material of the invention is expected to be good. Thus, UV resistance is likely to be very good and even resistance to hard radiation is likely to improved relative to the underlying material itself FG has excellent electrical properties. FG is insulating and its mechanical strength may lead to enhancements in dielectric breakdown strength in composites to which it is added. It may be also used to modify the dielectric constant of the composite materials.

Bearing in mind the above properties, there are a number of possible applications for composite material according to the invention. The key benefit throughout is the possibility of producing a relatively strong and stiff, creep and wear resistant family of FPs. This will open up new applications and extend the range of existing applications.

In some embodiments, the addition of FG to FPs and also to other polymeric materials can enhance their properties. This may include increases in strength and modulus and creep and wear resistance. It may also improve temperature resistance, chemical resistance and certain electrical properties. It may make the exceptional properties of fluoropolymers and other materials available in a wider range of more demanding applications and environments. It may allow for the combination of near universal chemical resistance with improved strength, modulus, creep and wear resistance.

Suitable fluoropolymers include but are not limited to the following polymers and their copolymers: polytetrafluoroethylene; fluorinated ethylenepropylene; perfluoroalkoxy resins; tetrafluoroethylene/perfluoromethylvinylether copolymers; tetrafluoroethylene/perfluoropropylvinylether copolymers; polychlorotrifluoroethylene; polyvinylidene fluoride; polyvinylfluoride; polyethylenetetrafluoroethylene; fluorocarbon elastomers; fluorosilicons; terpolymers of tetrafluoroethylene, hexafluoropropylene and vinylidenefluoride; terpolymers of tetrafluoroethylene, hexafluropropylene and ethylene.

The product formulations may be in any form including aqueous and non aqueous dispersions, granular forms, powders, very fine powders, rods, blocks, mouldings, membranes, films, fibers, sheets, foams, honeycombs, micro porous membranes and microporous fibers. They may contain fillers and/or reinforcing fibers.

Potential applications also include enhanced:

(a) Engine and transmission components; seal rings; thrust washers; bearings; gaskets; friction washers; bushings; fork pads; sensor housings; connector linings; tanks; pipes; tank and pipe linings; fuel lines; fuel filters; fuel filter housings; fuel tanks; fuel tank manhole covers; fuel tank linings; vacuum pump vane tips; backup rings; piston rings; sleeves; lubricant free wear plates; O rings; shaft seals; thermostat housings; fuse holders; exhaust gas recirculation components; and air intake manifolds;

(b) Wire and cable insulation; wire insulation stand offs; cable insulation for safety systems and switchgear; cable wrapping tape; measurement probes; high voltage circuit breakers; insulation in motors, transformers, relays and switches; insulation for electronic equipment in computers and aircraft and for wrapping coaxial cables; coil bobbins; terminal blocks; battery casings; electrical connectors; components that are resistant to lead free solder processes; capacitor dielectrics; battery gaskets;

(c) Films; self adhesive tapes; braided fiber; thermal, acoustic and burn though insulation; fire barriers; cable ties; tubes; catheters;

(d) Semiconductor processing equipment; wafer carriers; robotic wands; wafer processing and cleaning equipment;

(e) Membranes; highly porous membranes; expanded porous membranes; heat exchanger components; analytical equipment components; food processing equipment; cooking equipment; pump, valve and impellor housings and liners; valve plates; bellows; lined pipes; ball and roller bearing components; bearing films; sliding bearing pads; expansion joints; coated metal components; over braided hoses; laboratory ware; antistick conveyor belts; roll coverings; heat sealing materials; corrugated tubing; oilfield down hole instruments; pipes and hoses; pipe and hose liners; oilfield riser liners; drill bit seals; umbilical liners; chemical process equipment; chemical process instrument housings and seals; separation and distillation column plates and packings; labyrinth seals; compressor components; woven filter cloth; gas flues; wire guides; yarn and thread guides; metalized films; release films; solar collector windows; heat sealable tubing, shrinkable tubing; extruded and irradiated heat shrinkable tubing;

(f) Barrier packaging for drugs, moisture sensitive chemicals and electronic devices; pharmaceutical blister packs; encapsulation of phosphor coatings in electroluminescent lamps;

(g) Coatings: exterior and interior protective and/or low friction coatings for example on pipes, tanks, ducts, bearings, wear plates, protective sleeves, industrial rollers, copier rollers, split fingers, process belts, pumps, valves, medical devices, drill bits, food processing equipment, cooking equipment, frying pans, rice cookers, non stick cookware and bakeware; protective and decorative coatings; UV resistant coatings; coated fabrics; surface protection of textiles, leathers, glass, paper, wood;

(h) High strength fibers; low creep fibers; high modulus fibers. Fibers in marine awnings, conveyor belts, release fabrics, dental floss and high performance ropes.

(i) Coated fabrics, coated glass or aramid fabrics, films and coated fabrics for construction applications such as roofing or siding materials; coated fabrics and woven fibers for safety clothing and gloves; and (j) Healthcare sterilization and transport containers; catheters and laparoscopic tubes benefiting from stiffness; pipettes and Petri dishes.

In addition to the above, there are a number of possible applications which could take advantage of the flexible nature of the material. These include: oil control pistons; throttle bodies; ignition components; bearing retainers and cages; gears; vacuum pump vanes; bolts; nuts; inserts and brackets; speaker films and microphones.

Applications of the material of the present invention can either be in the form of the FG material itself or in combination with another material or materials. The FG material can be used for example in a number of electronic and mechanical applications. Examples of uses include:

chemical
biocompatible materials/grafts,
corrosive chemical containers,
anti-oxidation coatings,
anti-ozone coating,
combustion modifier,
dielectric,
high RF insulator—cables/polymers/PCBs,
cathode—lithium batteries,
electrets—analogs of magnets,
semiconductor,
nano-scale computing/electronics,
gas and moisture barrier films,
biological membranes,
coatings/packaging/polymers,
non-stick coatings,
bearings,
coatings,
self-cleaning materials,
radiometry,
transparent coatings,
optoelectronics,
LED, lasers,
anti wetting coating,
stain repellent,
lubricants/solid lubricant,
seals,
paints/polymers/coatings, and
anti-sunlight coatings.

EXAMPLES

Example 1

Fluorographene by Exfoliation of Graphite Fluoride (GrF)

Due to the layered nature of GrF, monolayers formation by mechanical exfoliation was attempted. As discussed above, to obtain monolayer FG that was studied in the present work a different approach was used. This was partially because the efforts to obtain monolayers by mechanical cleavage of GrF were relatively unsuccessful and resulted only in small (micron-sized) and structurally damaged monolayers.

The initial GrF material used for exfoliation is a white fine powder with a nominal composition $CF_{1.1\pm0.05}$ as measured by X-ray photoemission spectroscopy (XPS). The material was found to be extremely difficult to cleave down to individual layers. Only crystallites with a several nm thickness were in abundance. Nonetheless, careful "hunting" in an optical microscope (on top of an oxidized Si wafer with 300 nm of $SiO_2$) allowed to find a few samples of monolayers. The monolayers give rise to little optical contrast and to locate them attention was concentrated on areas near thicker flakes. The contrast was only a few % and mostly in blue (c.f.>10% for graphene). Consecutive AFM measurements showed that these regions were <2 nm thick which is similar to the AFM apparent thickness of single-layer graphene on $SiO_2$.

GrF monolayers were easily visualized in SEM because their SEM contrast was even stronger than that of graphene (probably, due to GrF's high resistivity). Unfortunately, SEM provides no indication of the thickness of GrF. To this end, monolayers were identified as flakes visible in SEM but with a vanishingly little optical contrast. Identification of cleaved GrF monolayers was confirmed retrospectively by using fluorographene obtained by $XeF_2$ exposure, which exhibited the same optical, AFM and SEM characteristics. The difficulties of producing FG by mechanical cleavage were attributed to the small size of crystallites in the initial GrF material and the fragility of monolayers because of the presence of a large number of structural defects in the GRF.

Example 2

Fluorination of Few-Layer Graphene

Figure 8:
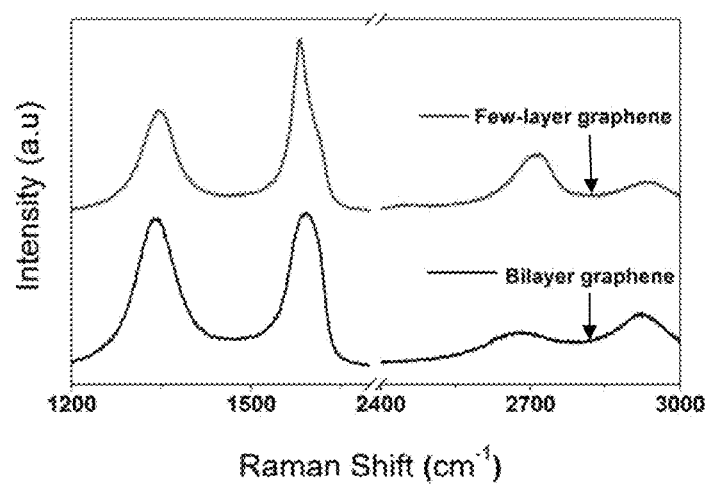
FIG. 8 shows the Raman spectra for bi-layer and few-layer graphene.

Bi- and few-layer graphene samples were suspended on TEM grids and then fluorinated for several days. FIG. 8 shows the Raman spectra for bi-layer and few-layer graphene. The intense D peak and the suppression of the 2D peak in the Raman spectra show that the fluorination reaction takes place even in multilayer samples. However, in comparison to monolayer graphene, the reaction is slow, which means the reactivity of the 2D material exposed from both sides is much higher than that of its 3D counterpart, in which fluorine has to diffuse between atomic planes.

Example 3

Stability of Fluorographene

Figure 9:
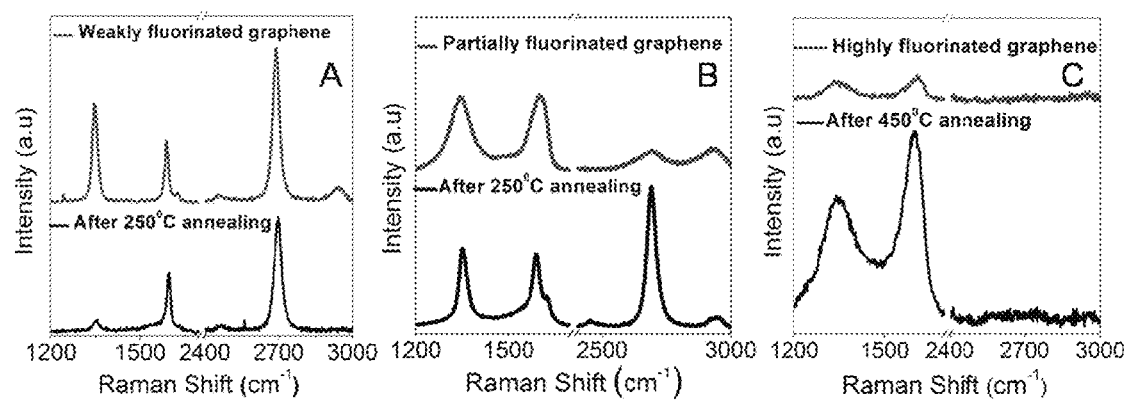
FIG. 9A-C shows the Raman spectra of graphene fluorinated to various levels and then annealed at different temperatures.

Raman spectroscopy provides a quick and non-destructive tool to evaluate the material. The Raman analysis was carried out by using Renishaw spectrometer (wavelength of 514.5 nm) and graphene fluorinated in $XeF_2$ and then transferred onto an oxidized silicon wafer (step 5 in FIG. 1). No changes could be detected in Raman signatures of FG after its exposure to various solvents (listed in the main text) and ambient air for many weeks. To induce changes in the FG composition, samples were annealed at different T. FIG. 9 shows the Raman spectra of graphene fluorinated to various levels and then annealed at different T. (A,B,C)—Raman spectra for weakly, moderately and highly fluorinated graphene, respectively. FIG. 9 thus shows Raman spectra for graphene fluorinated to different levels and then annealed in an argon-hydrogen (10%) mixture. One can clearly see from this figure that the stability of fluorinated monolayers strongly depends on the level of their fluorination. The D peak in weakly (1 h) fluorinated graphene practically disappears after annealing at 250° C., which indicates the reversibility of the initial chemical reaction (FIG. 9A). For moderately fluorinated graphene (several h), the annealing at 250° C. led to a partial recovery with a strong D peak left afterwards. Attempts to anneal such samples at higher T resulted in a further increase of the D peak, which could be attributed to structural defects formed when F was removed at high T. No change in the Raman spectra of FF graphene at T up to 200° C. was seen, except for the appearance of a weak luminescence background (with a broad peak centered at approximately 1.7 eV) (not shown). Prolonged annealing at 450° C. led to the rise of the G and D peaks but the 2D peak did not recover (FIG. 9C). This probably indicates that the graphene scaffold becomes damaged with the loss of both C and F (similar Raman spectra were observed for FG after its long exposure to a 300 kV electron beam in TEM).

Example 4

Chemical Composition of Extensively Fluorinated Graphene

The saturation observed for the Raman spectra in FIG. 2a,b and the close similarity between the spectra of FF membranes and GrF (FIG. 2c) show that the former should have a composition with an F/C ratio close to ≈1. To find out more, X-ray photoelectron spectroscopy was employed. The XPS spectra of FG membranes revealed both F and C—F peaks indicating their extensive fluorination (F/C ratio≥0.7) but the samples were too small for accurate composition analysis. Moreover, the supporting polymer (Quantifoil) scaffold was also fluorinated, which further obscured the XPS analysis.

To circumvent the problem, large (cm-sized) areas of few-layer graphene grown on SiC were fluorinated. The fluorination process was monitored by Raman spectroscopy. It required two months of the exposure to $XeF_2$ to reach a saturated state with Raman spectra similar to those in the upper two curves in FIG. 2a (20 to 30 h), depending on spot position. This was despite the fact that pristine SiC samples exhibited a strong D peak, indicating many defects and grain boundaries, which should have enhanced diffusion of atomic F between graphene planes.

Figure 10:
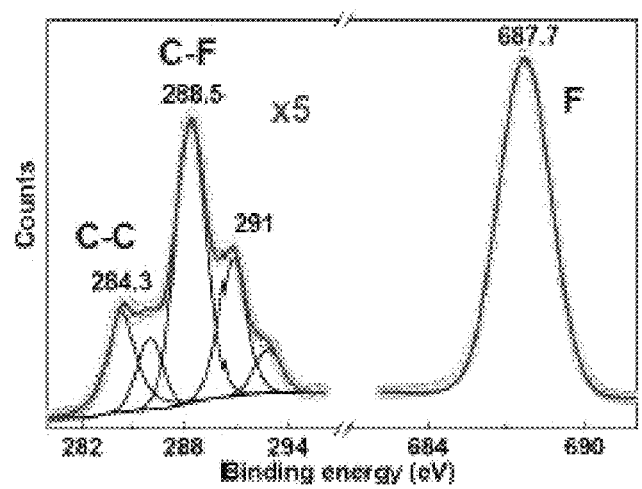
FIG. 10 show XPS for graphene grown on SiC and fluorinated for two months in $XeF_2$ at 70° C. Symbols are the measurements (carbon signal from SiC substrate is subtracted); solid curves the best fits.

FIG. 10 show XPS for graphene grown on SiC and fluorinated for two months in $XeF_2$ at 70° C. Symbols are the measurements (carbon signal from SiC substrate is subtracted); solid curves the best fits.

FIG. 10 thus shows typical XPS spectra for such extensively fluorinated graphene on SiC, which was still somewhat short of the FF state achieved for suspended graphene. One can see the pronounced F peak at 688 eV and the C—F peak at ≈289 eV. Their positions yield strong, covalent F bonding. The peak at ≈284 eV corresponds to C—C bonding, and the other peaks indicates the presence of different types of C—F bonding, including $CF_2$ (≈291 eV) and $CF_3$ (≈293 eV). The spectrum shown in FIG. 10 yields an F/C ratio of ≈0.9. The ratio varied between 0.8 and 1.1 for different spots on SiC samples, and the relative intensities of the C—F peaks also varied. F/C ratios larger than 1 are common for GRF and due to the presence of structural defects, which allow more C bonds to be terminated with fluorine ($CF_2$ and $CF_3$ bonding). The F/C ratios less than 1 can be attributed to the presence of partially fluorinated regions within an area of ≈100 μm in diameter that is probed by XPS. The XPS measurements provide proof that graphene membranes (that allowed much quicker fluorination and exhibited weaker Raman signatures and no spatial inhomogeneity) contained more fluorine than graphene on SiC and, therefore, had a composition closer to stoichiometric than the latter.

Example 5

Electron Transport in Weakly and Partially Fluorinated Graphene

The electrical measurements of fluorinated graphene were carried out in the dc regime by using Keithley's 2410 SourceMeter and 2182A NanoVoltmeter. I-V characteristics and their T dependence were recorded for devices placed in a cryostat in a helium atmosphere. Similar devices but with no graphene sheet present showed a leakage current up to ~0.1 nA when a high source-drain voltage of 10 V was applied. This is attributed to parasitic parallel resistances in the measurement circuit.

The electrical characteristics for graphene were investigated at smaller levels of fluorination. For weakly fluorinated graphene (1 hour at 70° C.), the devices exhibited ρ in the MΩ range and their I-V characteristics remain linear for all measured T (>4K). Only a weak increase in ñ with decreasing T was observed. The devices exhibited strong donor doping (>$10^{13}$ cm$^{-2}$) and the electric field effect with a low mobility of 0.1 to 1 cm$^2$/Vs. This behavior can be explained by the presence of both fluorinated and pristine regions so that electron transport occurs mostly through the latter and involves lengthy percolation paths.

For the case of partially fluorinated graphene, the device exhibited Raman spectra similar to the 9 hour curve in FIG. 2a. At room T, its I-V characteristics were linear and the resistance R was well below 1 MÙ (corresponds to ρ≈5 MΩ). At lower T, R rapidly increased and I-V characteristics became strongly nonlinear below 50 K. However, the Ohmic regime persisted at higher T and low source-drain voltages. It is clear that electron transport in partially fluorinated graphene involves hopping between impurity states.

Example 6

AFM Measurements of Mechanical Properties

To study the stiffness and breaking strength of FG a Veeco AFM (MultiMode Nanoscope) and tapping-mode doped silicon tips (Nanosensors PPP-NCHR) were used. The tip radii were controlled by direct observation in SEM before and after the experiments. In total, 15 pristine and the same number of fully fluorinated membranes were investigated and then intentionally destroyed in the experiments. First the membranes (of diameter D≈1.7 μm) were scanned in the tapping mode. Then the tip was positioned within D/10 from the centre of the membrane. The cantilever was then pushed into the sample until a threshold deflection was reached. The indentation δ of the membrane center was calculated from the difference between the cantilever deflection d and the vertical tip movement z. The cantilever deflection was calibrated on a surface of silicon oxide which was assumed to be infinitely hard (that is, d=z). The load imparted on the membrane was calculated from the deflection of the cantilever and its effective spring constant k (≈40 N/m for the cantilever) as F=kd.

Figure 11:
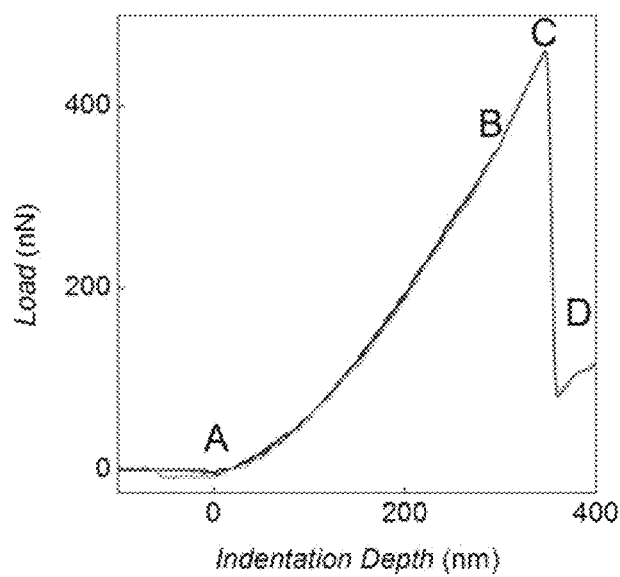
FIG. 11 shows typical loading and unloading curves for FG membranes.

FIG. 11 shows typical loading and unloading curves for FG membranes. The first contact between the tip and the membrane happens at point A. The curves do not reach the maximum load and are non-hysteretic. If the load exceeded a certain limit (point C), the loading curve exhibited a sudden drop and was irreproducible in region D where the membrane was broken.

For small indentation depths (below the break point) no hysteresis between loading and unloading was observed and subsequent indentations were identical (FIG. 11). This shows that there was no slippage of the membranes relatively to the Quantifoil support during indentation. Breaking force Fb was determined from the maximum bending $d_{max}$ of the cantilever before a membrane broke as $F_b=kd_{max}$ (FIG. 11). The breaking force was found to be in the range 250-800 nN for fluorinated and 900-1500 nN for pristine membranes.

To determine the Young modulus E, a model which involves two elastic membranes in series was employed using a well known method reported in Lee, C., Wei, X. D., Kysar, J. W. & Hone, J. Measurement of the elastic properties and intrinsic strength of monolayer graphene. *Science* 321, 385-388 (2008). The two-dimensional Young modulus for fluorographene was found to be of 100±30 N/m. The same parameters also yielded E≈340 N/m for pristine graphene.

Example 7

Raman Data

Raman suggests that thermal treatment (heating under static pressure of argon, for 1 hr at 250 C) of the lowest % FG sample that we have prepared (58% by XPS) has not resulted in any significant change (according to Raman). The relative intensities of the D, G and 2G peaks are roughly the same when compared with the Raman spectrum collected for the same sample previously. This shows the material is thermally stable even at 250 C and we also demonstrated similar stability at 350 C in a subsequent experiment.

Example 8

XPS Analysis of Fluorinated Carbon Samples on Alumina and Silicon Wafer Substrates The samples described in the following table were analyzed using X-ray Photoelectron Spectroscopy ("XPS") using the Kratos 'Axis Ultra' instrument. The aim of the investigation was to measure the surface C:F ratio of each sample.

The samples were presented as small irregular shaped specimens some on an aluminum substrate and some mounted on a small piece of silicon wafer. The specimens had been stored inside plastic containers.

Summary of Results.

1. Small area XPS measurements (ca. 110 m×110 m analysis area) were carried out on the samples. Spectra were recorded from three points on each specimen and were used to quantify the relative surface composition at each point.

2. The relative surface composition results and relative C:F ratio values for any particular sample were consistent with the presence of a fairly uniform fluorinated carbon layer.

3. There was variation in the mean C:F ratio value between the samples, with the lowest value obtained being 1.06 and the highest 1.72.

4. Peak fit analysis of the high resolution C 1s spectra can be carried out in order to estimate the relative proportions of C—C, C—F, C—F2 and CF3 functionality.

Experimental Details

In all cases the small specimens were removed from the plastic containers and mounted on a suitable XPS sample holder using small pieces of silicone-free double-sided tape. Three measurements were performed on specimen. For the XPS work, data was recorded from a ca. 110 m×110 m area using monochromated A1k X-rays.

The expanded uncertainty, Y, in atomic percentage units, associated with a measured atomic percentage composition, X, can be calculated for polymer and organic materials analyzed using survey scan conditions (160 eV pass energy on the Kratos Axis Ultra) from the expression Y=mX+c where m=0.027 and c=0.14. The reported expanded uncertainty is based on a standard uncertainty multiplied by a coverage factor of k=2, providing a level of confidence of approximately 95%. For metals and inorganic materials this is only an approximate guide.

XPS has a sampling depth which depends on the material density but is around 10 nm for organic/polymeric materials and ca. 3-5 nm for metal/oxide materials. The accepted detection limit is around 1 atom in 1000 (excluding H, i.e. 0.1 atomic percent or 1000 ppm.) The analytical results presented in this example only apply to the actual sample surfaces analyzed and surface chemical compositions can vary significantly.

Survey scans were recorded at 160 eV pass energy to identify all elements (except H) present on the specimen surfaces; these were also used to quantify the surface composition. The results obtained are presented in Table 1 as relative atomic percent. High-resolution spectra were also recorded at 40 eV pass energy in order to identify the chemical environment for specific elements (fluorine and carbon).

TABLE 1

Relative atomic % composition results

| Sample | Datafile | Relative Atomic Percentage Composition | | Relative C:F ratio |
|---|---|---|---|---|
| | | F | C | |
| FGP005 | 5629A1 | 39.69 | 46.35 | 1.17 |
| | 5629A2 | 40.16 | 46.41 | 1.16 |
| | 5629A3 | 39.94 | 46.23 | 1.16 |
| | mean | 39.9 | 46.3 | 1.16 |
| | std dev | 0.24 | 0.09 | 0.01 |
| FGP015 | 5629B1 | 37.72 | 39.72 | 1.05 |
| | 5629B2 | 38.18 | 39.22 | 1.03 |
| | 5629B3 | 36.37 | 40.24 | 1.17 |
| | mean | 37.4 | 39.7 | 1.06 |
| | std dev | 0.94 | 0.51 | 0.04 |

TABLE 1-continued

Relative atomic % composition results

| Sample | Datafile | Relative Atomic Percentage Composition | | Relative C:F ratio |
|---|---|---|---|---|
| | | F | C | |
| FGP016 | 5629C1 | 33.48 | 57.20 | 1.71 |
| | 5629C2 | 34.74 | 55.64 | 1.60 |
| | 5629C3 | 34.25 | 56.61 | 1.65 |
| | mean | 34.2 | 56.5 | 1.65 |
| | std dev | 0.64 | 0.79 | 0.05 |
| FGP017 | 5629D1 | 32.90 | 57.06 | 1.73 |
| | 5629D2 | 33.85 | 56.57 | 1.67 |
| | 5629D3 | 33.05 | 57.52 | 1.74 |
| | mean | 33.3 | 57.0 | 1.72 |
| | std dev | 0.51 | 0.48 | 0.04 |
| FGP019 | 5629E1 | 37.38 | 55.12 | 1.47 |
| | 5629E2 | 37.44 | 54.40 | 1.45 |
| | 5629E3 | 37.87 | 53.39 | 1.41 |
| | mean | 37.6 | 54.3 | 1.45 |
| | std dev | 0.27 | 0.87 | 0.03 |
| FGP020 | 5629F1 | 38.28 | 54.52 | 1.42 |
| | 5629F2 | 37.77 | 54.92 | 1.45 |
| | 5629F3 | 37.95 | 54.81 | 1.44 |
| | mean | 38.0 | 54.7 | 1.44 |
| | std dev | 0.26 | 0.21 | 0.02 |
| FGM8 | 5629H1 | 38.31 | 57.83 | 1.51 |
| | 5629H2 | 39.73 | 56.73 | 1.43 |
| | 5629H3 | 38.48 | 57.53 | 1.50 |
| | mean | 38.8 | 57.4 | 1.48 |
| | std dev | 0.78 | 0.57 | 0.04 |
| FGM9 | 5629I1 | 39.42 | 51.09 | 1.30 |
| | 5629I2 | 39.16 | 51.11 | 1.31 |
| | 5629I1 | 39.75 | 49.66 | 1.25 |
| | mean | 39.4 | 50.6 | 1.28 |
| | std dev | 0.30 | 0.83 | 0.03 |
| FGM14 | 5629J1 | 41.80 | 53.95 | 1.29 |
| | 5629J2 | 41.64 | 54.06 | 1.30 |
| | 5629J3 | 41.27 | 54.74 | 1.33 |
| | mean | 41.6 | 54.2 | 1.31 |
| | std dev | 0.27 | 0.43 | 0.02 |

XPS detects all elements (except hydrogen) that are present within the top 10 nm of the surface. As the surfaces were functionalized fluorinated polymeric based systems then carbon, fluorine and oxygen were the major elements detected as shown by the relative atomic percentage composition results. Aluminum was also detected which probably arises from the substrate and other remaining low level elements are likely associated with processing residues, surfactant additives or adventitious surface contaminants, reflecting the history of the samples.

In all cases high resolution C1s and F1s spectra were characteristic of a fluorinated carbon surface with major components being due C—C, C—F, C—F2 and CF3 functionality. The proportion of which varied from sample to sample. A peak fit analysis could be performed in order to estimate the relative level of functionality.

For any particular sample the relative C:F ratio appeared uniform within the areas analyzed. There was significant variability between the samples with the lowest mean value being 1.06 (FGP005) and the highest 1.72 (FGP017).

Example 9

Data Illustrating the Stability and Bandgap of Fluorographene

FIG. 12 shows the optical transmission of fluorographene before and after annealing as a function of energy E This Figure shows the variation of optical transmission of pristine and annealed FG as a function of energy E. From the figure it is clear that the observed band gap~3 eV is stable after annealing at 350° C. in argon.

FIG. 13 shows the optical transparency of fully fluorinated and partially fluorinated graphene as a function of Energy E. This Figure shows the variation of optical transmission with energy for fully and partially fluorinated graphene. The opacity of FG above 3 eV is the characteristic of the bandgap. The variation of optical transmission with energy for partially fluorinated graphene is significantly different from that of FG and doesn't show any clear bandgap.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

We claim:

1. A fluorographene-polymer composite comprising a polymer and a fluorographene, wherein the fluorographene comprises a sheet formed from a lattice of carbon atoms, wherein at least 85% of the carbon atoms in the lattice are bound to one fluorine atom each.

2. The fluorographene-polymer composite of claim 1, wherein the sheet includes a monolayer of carbon atoms.

3. The fluorographene-polymer composite of claim 1, wherein the fluorographene has less than 10% defects in the form of intrinsic defects.

4. The fluorographene-polymer composite of claim 1, wherein the polymer is a fluoropolymer.

5. The fluorographene-polymer composite of claim 4, wherein the polymer is polytetrafluoroethylene.

6. The fluorographene-polymer composite of claim 4, wherein the polymer is a copolymer of tetrafluoroethylene and hexafluoropropylene.

7. The fluorographene-polymer composite of claim 4, wherein the polymer is a copolymer of tetrafluoroethylene and perfluorinated vinyl ether.

8. The fluorographene-polymer composite of claim 4, wherein the polymer is a copolymer of ethylene and tetrafluoroethylene.

9. The fluorographene-polymer composite of claim 4, wherein the polymer is a copolymer of ethylene and chlorotrifluoroethylene.

10. The fluorographene-polymer composite of claim 4, wherein the polymer is a homopolymer of vinylidene fluoride.

11. The fluorographene-polymer composite of claim 4, wherein the polymer is a copolymer of vinylidene fluoride and hexafluoropropylene.

12. The fluorographene-polymer composite of claim 4, wherein the polymer is a copolymer of tetrafluoroethylene and perfluoromethylvinylether.

13. The fluorographene-polymer composite of claim 4, wherein the polymer is a terpolymer of tetrafluoroethylene, hexafluoropropylene, and vinylidene fluoride.

* * * * *